US006464413B2

(12) United States Patent
Oyamada

(10) Patent No.: US 6,464,413 B2
(45) Date of Patent: Oct. 15, 2002

(54) HEAT DEVELOPMENT SYSTEM

(75) Inventor: Takayoshi Oyamada, Minami Ashigara (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/851,331

(22) Filed: May 9, 2001

(65) Prior Publication Data

US 2001/0055490 A1 Dec. 27, 2001

(30) Foreign Application Priority Data

May 9, 2000 (JP) ........................................ 2000-136023

(51) Int. Cl.[7] ........................................ G03B 13/00

(52) U.S. Cl. ........................................ 396/575

(58) Field of Search .................... 396/575; 355/27–30; 219/216; 430/350, 566

(56) References Cited

U.S. PATENT DOCUMENTS 3,152,904 A 10/1964 Sorensen et al. ........... 430/350
3,457,075 A 7/1969 Morgan et al. ............ 430/566
5,893,003 A * 4/1999 Allen ......................... 219/216
5,965,346 A * 10/1999 Inagaki et al. .............. 430/577
5,965,347 A * 10/1999 Bauer et al. ................ 430/617
5,975,772 A * 11/1999 Imai et al. .................. 219/216
6,152,616 A * 11/2000 Torisawa .................... 396/575
6,197,487 B1 * 3/2001 Ohnuma et al. ............ 428/480
6,309,114 B1 * 10/2001 Torisawa et al. ............ 219/216

* cited by examiner

*Primary Examiner*—D. Rutledge
(74) *Attorney, Agent, or Firm*—Birch, Stewart, Kolasch & Birch, LLP

(57) ABSTRACT

A heat development system of forming an image by exposing and heat developing a sheet-form heat developable light-sensitive material by using a heat development image-forming apparatus comprising a conveying member, a light-sensitive material-supplying member and an image exposure member, said heat developable light-sensitive material comprising a support and a light-sensitive layer comprising a binder, an organic silver salt, a reducing agent for a silver ion, and light-sensitive silver halide grains.

11 Claims, 1 Drawing Sheet

HEAT DEVELOPMENT SYSTEM

FIELD OF THE INVENTION

The present invention relates to a heat development system. More specifically, the invention relates to a heat-developable photographic light-sensitive material which is excellent in storage stability (shelf life) with the passage of time and has a good antistatic faculty.

BACKGROUND OF THE INVENTION

In a recent medical treatment field, from the view points of environmental preservation and space saving, the reduction of the amount of the treated waste liquids has been strongly desired. Therefore, the techniques in regard to heat-developable light-sensitive materials (photosensitive heat-developable photographic materials) for medical treatment diagnoses and photographic techniques capable of being efficiently exposed by a laser•image setter or a laser•imager and capable of forming clear black images having a high resolution and a high sharpness have been required. In these heat- developable light-sensitive materials, solution-type processing chemicals are not used and a heat-development system, which is simpler and does not spoil the environment, can be supplied to customers.

Heat-developable light-sensitive materials are described, for example, in U.S. Pat. Nos. 3,152,904 and 3,457,075 and Klosterboer, "Thermally Processed Silver Systems" A, "Imaging Processes and Materials" Neblette, 8th edition, edited by Sturge, V. Walworth, and A. Shepp, Paragraph 9, page 279 (1989). Such a heat-developable light-sensitive material contains a reducible light-sensitive silver source (e.g., an organic silver salt), a photocatalyst (e.g., a silver halide) of a catalytically active amount, and a reducing agent of silver in the state of usually being dispersed in an organic binder matrix. The heat-developable light-sensitive material is stable at normal temperature but after exposure, the heat-developable light-sensitive material is heated at a high temperature (for example, at least 80° C.), silver is formed through the oxidation- reduction reaction between the reducible silver source (functions as an oxidizing agent) and the reducing agent. The oxidation-reduction reaction is accelerated by the catalytic reaction of an electrostatic latent image formed by the exposure. Silver formed by the reaction of the reducible silver salt in the exposure region provides a black image, which is in contrast with non-exposed regions to form an image.

On the other hand, the technique of a semiconductor laser, which has recently been rapidly progressing, has been applied to a heat-development image-forming apparatus of outputting diagnosis images for medical treatment and small- sizing the apparatus and quickness have been realized. However, with small-sizing of the apparatus, conveying route of heat- developable light-sensitive materials has been complicated. That is, because the heat-developable light-sensitive material is transferred by many rollers made of various materials, dusts attach thereto by static electricity formed at transferring to soil the image information, which increases the danger of causing a wrong diagnosis at present. Particularly, when the conveying speed at the conveying member before exposure is fast, dusts, etc., are more liable to be attached, whereby a correct image exposure is not carried out to give very serious problems.

For preventing the generation of static electricity, a high-molecular electrolyte and an ionic surface active agent has hitherto been used but because these compounds have a large hygroscopic property, there are problems that the humidity reliance of the antistatic effect becomes large and also the environmental temperature and the humidity reliance at exposure and heat development are deteriorated. Also, when a crystalline metal oxide is used for static prevention, there is a problem that the $D_{min}$ has hitherto been increased. Particularly, because in the case of a heat-developable light-sensitive material, a fixing treatment is not carried out after heat development, there is a problem that the extent of increasing the $D_{min}$ is large. Furthermore, different from ordinary photographic light-sensitive materials using silver halides, there is a problem of increasing the formation of fog in the product form.

SUMMARY OF THE INVENTION

In view of these problems in the techniques of prior art, an object of the invention is to provide a heat-developable light-sensitive material, which is excellent in shelf life with the passage of life and shows a good antistatic faculty in a heat development system of forming images using a heat-development image-forming apparatus having quickened conveying members. In particular, an object of the invention is to provide a heat-developable light-sensitive material, which gives less increase of the formation of fog even in the case of using after storing for a long period of time and gives less white spots of images owing to the excellent antistatic characteristics in the heat development system.

As a result of making various investigations for solving the above-described problems, the present inventors have found that the above-described objects can be attained by the following invention.

That is, the present invention is a heat development system of forming images by exposing and heat developing a sheet-form heat developable light-sensitive material comprising a support having on one surface thereof a binder, an organic silver salt, a reducing agent for silver ion, and light-sensitive silver halide grains by a heat development image-forming apparatus, wherein the conveying speed in the conveying member of conveying the heat developable light-sensitive material from the light-sensitive material-supplying member to an image exposure member in the heat development image-forming apparatus is 1 meter/minute to 5 meters/minute, the sum total content of the organic silver salt and the heat-developable light-sensitive silver halide in the light-sensitive material is 1 g/$m^2$ to 2 g/$m^2$ in terms of Ag, and the heat-developable light-sensitive material has at least one back layer in the opposite side to the surface having formed thereof a heat-developable light-sensitive layer containing the light-sensitive silver halide grains, has an electrically conductive layer having dispersed in a binder at least one kind of a crystalline metal oxide selected from ZnO, $TiO_2$, $SnO_2$, $Al_2O_3$, $In_2O_3$, $SiO_2$, MgO, BaO, and $MoO_3$ or a composite oxide of them, and the lateral resistance thereof under the environment of 25° C. and a relative humidity of 10% is not larger than $10^{11}\Omega$.

In the heat-developable light-sensitive material used for the heat development system of the invention, it is preferred that the electrically conductive layer is formed at least at the position between the heat-developable light-sensitive layer and the support and between the back layer and the support. Also, it is preferred that the lateral resistance thereof under the environment of 25° C. and a relative humidity of 10% is not larger than $10^{10}\Omega$. The heat-developable light-sensitive material is particularly useful for a medical treatment diagnosis.

DETAILED DESCRIPTION OF THE INVENTION

Figure 1:
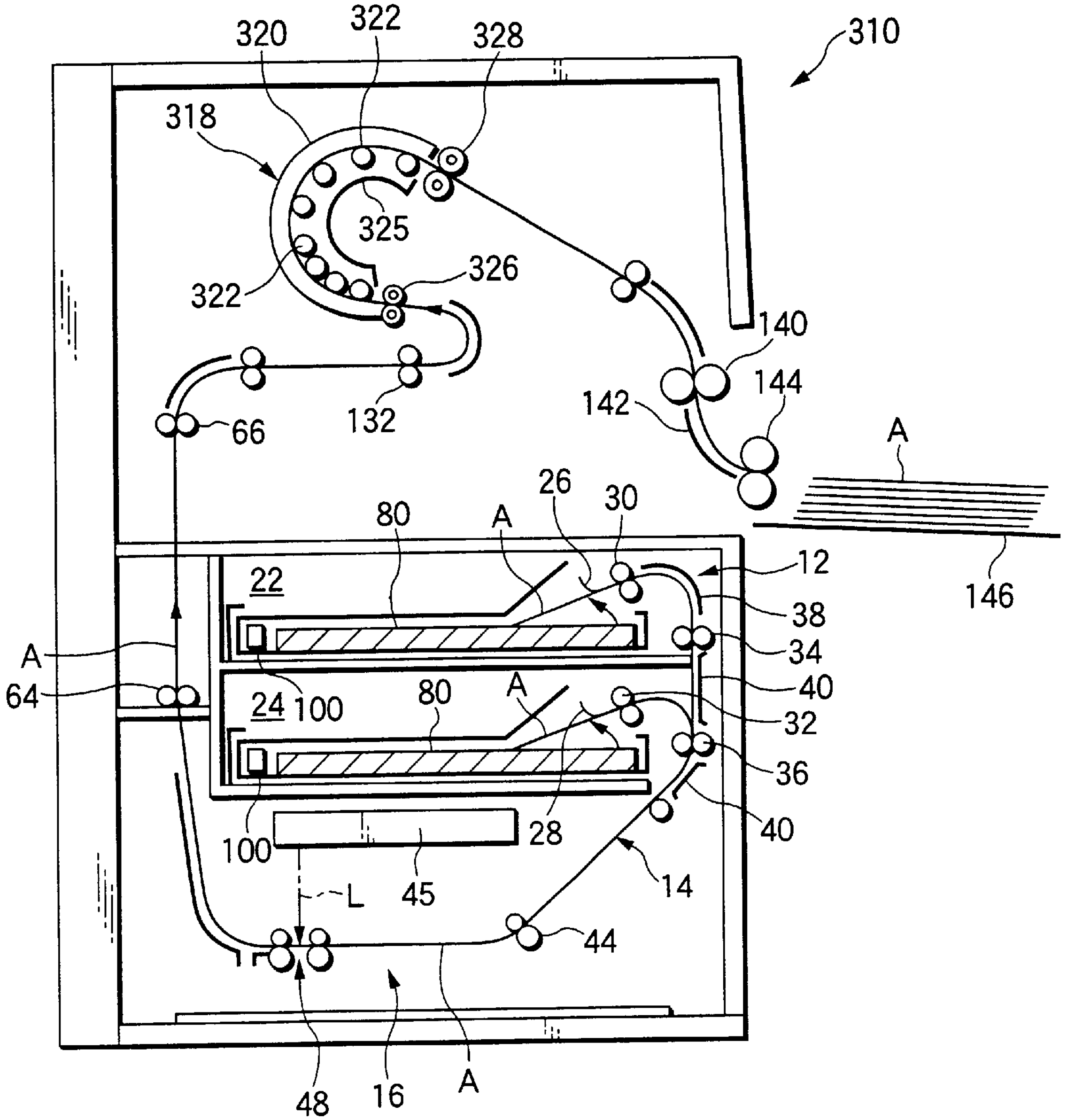
FIG. 1 is a schematic view showing an embodiment of a heat development image-forming apparatus capable of being used in the invention.

The present invention is described in detail below.

The heat development system of the invention is formed by a heat-developable light-sensitive material and a heat-development image-forming apparatus forming images using the heat-developable light-sensitive material.

First, the heat-developable light-sensitive material used in the invention (hereinafter, is referred to as the heat-developable light-sensitive material of the invention) is explained in detail.

The heat-developable light-sensitive material of the invention includes a binder, an organic silver salt, a reducing agent for silver ion, and light-sensitive silver halide grains on one surface of a support. In the specification, the layer containing the light-sensitive silver halide grains is referred to as a light-sensitive layer or an emulsion layer. On the surface of the support opposite to the surface having formed the light-sensitive layer, a back layer is formed and the heat-developable light-sensitive material of the invention functions as a so-called single-side light-sensitive material. Also, the heat-developable light-sensitive material of the invention has an electrically conductive layer having dispersed in a binder at least one kind of a crystalline metal oxide selected from ZnO, $TiO_2$, $SnO_2$, $Al_2O_3$, $In_2O_3$, $SiO_2$, MgO, BaO, and $MoO_3$ or a composite oxide of them. Also, the heat-developable light-sensitive material of the invention may have a protective layer, an interlayer, a UV absorbing layer, an antihalation layer, a subbing layer, a back-protective layer, etc., in addition to the light-sensitive layer and the back layer.

The sum total content of the organic silver salt and the light-sensitive silver halide grains in the heat-developable light-sensitive material of the invention is 1 $g/m^2$ to 2 $g/m^2$ in terms of Ag. Also, the lateral resistance under the environment of a temperature of 25° C. and a relative humidity of 10% is not larger than $10^{11}\Omega$.

The heat-developable light-sensitive material of the invention having the features described above is excellent in the shelf life with the passage of time and has a good antistatic faculty. Particularly, even when the heat-developable light-sensitive material is used after storing for a long period of time, the increase of the formation of fog is less and the formation of white spots on the image is less owing to the excellent antistatic characteristics, whereby the heat-developable light-sensitive material of the invention is useful as a medical treatment diagnosis.

Then, the electrically conductive layer in the invention is described. The electrically conductive layer may be formed at any member of the heat-developable light-sensitive material of the invention, but it is preferred that the electrically conductive layer is formed between the light-sensitive layer and the support and/or between the back layer and the support, and it is more preferred that the layer is formed between the back layer and the support. As an example of the electrically conductive metal oxide used for the layer, there are the fine particles (fiber form, acicular form, spherical form, sheet form, amorphous form, etc.) of at least one kind of a crystalline metal oxide selected from ZnO, $TiO_2$, $SnO_2$, $Al_2O_3$, $In_2O_3$, $SiO_2$, MgO, BaO, and $MoO_3$ or a composite oxide of them. The fine particles of the metal oxides and the composite oxides of them are described in detail in JP-A-56 143430 (the term "JP-A" as used herein means an "unexamined published Japanese patent application") and JP-A-60-258541. As a method of preparing the fine particles of the electrically conductive metal oxide, there are first a method of preparing the fine particles of the metal oxide by burning and applying thereto a heat treatment in the existence of a different kind of atom for improving the electric conductivity, secondary a method of preparing the fine particles of the metal oxide by burning in the existence of a different kind of atom, thirdly a method of lowering the oxygen concentration at burning to introduce oxygen defects, etc. As the different kind of atom, there are Al or In for ZnO, Nb or Ta for $TiO_2$, and Sb, Nb, P. B, In, V, or a halogen atom for $SnO_2$. The addition amount of the different atom is in the range of preferably 0.01 to 30 mol %, and more preferably 0.1 to 10 mol %. Furthermore, to improve the transparency, a silicon compound may be added at the formation of the fine particles.

Also, as described in JP-B-59-6235 (The term "JP-B" as used herein means an "examined Japanese patent application"), the electrically conductive material obtained by attaching the above-described metal oxide to other crystalline metal oxide particles or fibrous material (for example, titanium oxide) can be used.

The electrically conductive metal oxide used in the invention differs in the form, the size,, the volume conductivity, etc., according to the kind thereof but from the point capable of reducing the coating amount per unit area, a fibrous material having a large aspect ratio is most preferable and then the preferable order is an acicular form, a sheet form, an amorphous form, and a spherical form. Also, the volume resistivity is preferably lower, is preferably not higher than $10^7$ Ω·cm, more preferably not higher than $10^5$ Ω·cm, and far more preferably not higher than $10^2$ Ω·cm. The materials, which can most reduce the coating amount per unit including the form and the volume resistivity of the electrically conductive metal oxide, are a metal oxide made of $SnO_2$ as the main constituent and containing about 5 to 20% antimony oxide and the metal oxide further containing other component (e.g., silicon oxide, boron, phosphorus, etc.), ZnO, $TiO_2$, $In_2O_3$ (they are amorphous), and they can be preferably used in the invention. In these compounds, the metal oxide made of $SnO_2$ as the main constituent and containing about 5 to 20% antimony oxide and the metal oxide further containing other component (e.g., silicon oxide, boron, phosphorus, etc.) are particularly preferred.

When the electrically conductive metal oxide used in the invention is amorphous or a spherical form, the primary particle size is preferably 0.0001 to 1 μm, and more preferably 0.001 to 0.5 μm because the stability after being dispersed is good. Also, when the electrically conductive particles of 0.001 to 0.3 μm are utilized for improving the transmission of light, it becomes possible to form the transparent light-sensitive material, which is particularly preferred. These particles are secondary aggregates formed usually by aggregating at least several primary particles in the dispersion and the coated film and the mean particle size is preferably 0.5 to 0.005 μm, and in the point of the purpose of reducing the coating amount per unit area, the mean particle size is preferably 0.3 to 0.005 μm. more preferably 0.2 to 0.01 μm, and particularly preferably 0.18 to 0.01 μm.

There is no particular restriction on the coating amount of the electrically conductive metal oxide but a smaller coating amount per unit area is more preferred because the occurrence of coloring of the heat-developable light-sensitive material of the invention can be restrained. However, when the coating amount is too small, the antistatic property is not obtained. Accordingly, the coating amount per unit area may be 1 to 800 $mg/m^2$, is preferably 2 to 400 $mg/m^2$, more preferably 5 to 250 $mg/m^2$, and particularly preferably 10 to 150 $mg/m^2$.

When the electrically conductive metal oxide is a fibrous form or an acicular form, a larger aspect ratio (the ratio of long acid/short axis) can more reduce the coating amount per area. In the fibrous or acicular electrically conductive metal oxide preferably used in the invention, it is preferable that the length is not longer than 20 μm and the diameter is not larger than 1 μm, more preferably the length is not longer than 10 μm and the diameter is not larger than 0.3 mm, and particularly preferably the length is 0.1 μm to 10 μm. Also, the aspect ratio is at least 5, preferably at least 10, and more preferably at least 20. The coating amount per unit are may be 0.1 to 500 $mg/m^2$, preferably 0.5 to 300 $mg/M^2$, more preferably 0.5 to 150 $mg/m^2$, and particularly preferably 1 to 100 $mg/M^2$.

Also, the electrically conductive metal oxides can be coated as a mixture of two or more kinds thereof, and particularly, by using a mixture of the amorphous electrically conductive metal oxide, the spherical electrically conductive metal oxide, the fibrous electrically conductive metal oxide, and the acicular electrically conductive metal oxide, the further effect of restraining the occurrence of coloring of the heat-developable light-sensitive material can be sometimes expected. For example, by mixing the metal oxide made of $SnO_2$ as the main constituent and containing about 5 to 20% antimony oxide with 1/50 by weight of $V_2O_5$, the effect of restraining coloring of the heat-developable light-sensitive material is increased. In the invention, the electrically conductive metal oxide may be coated from a coating liquid containing it without using a binder but by considering the adhesion of the polymer layer on the electrically conductive layer, and the occurrence of peeling off of the metal oxide during the production of the heat-developable light-sensitive material, it is preferred to coat together with a binder. As the binder, all polymers having a film-forming property can be used. For example, a water-soluble binder such as gelatin, dextran, polyacrylamide, starch, polyvinyl alcohol, etc., may be used, or a synthetic polymer binder such as poly(meth)acrylic acid ester, polyvinyl acetate, polyurethane, polyvinyl chloride, polyvinylidene chloride, a styrene-butadiene copolymer, polystyrene, polyester, polyethylene, polyethylene oxide, polypropylene, polycarbonate, polyvinyl butyrate, etc., may be used with an organic solvent, or further, these polymer binders may be used as a form of an aqueous dispersion. In this case, the weight ratio of the electrically conductive metal oxide/the binder is 99/1 to 10/90 when the electrically conductive metal oxide is amorphous form or a spherical form, and it is better that the weight ratio of the electrically conductive metal oxide/binder is less and the antistatic property becomes higher. In order that the weight ratio of the electrically conductive metal oxide/binder is lowered and the antistatic property is increased, it is preferred to mix two or more kind of the binders to cause a phase separation or add an additive such as the flocculant of the metal oxide to design such that the metal oxides are bonded well to each other in the electrically conductive layer with a small amount thereof. The weight ratio of the electrically conductive metal oxide/binder is preferably 95/5 to 30/70, more preferably 90/10 to 50/50, and particularly 85/15 to 60/40. Also, the electrically conductive metal oxide is a fibrous form or an acicular for, the weight ratio is 80/20 to 0.1/99.9, preferably 70/30 to 1/90, more preferably 50/50 to 1/90, and particularly preferably 30/70 to 1/90.

In the invention, the lateral resistance is the edge electric resistance (Ω) of the heat-developable light-sensitive material. The lateral resistance is measured by the following method. That is, the light-sensitive material is cut to the size of 1.5 cm×5 cm, both the long sides of the sample are dipped at about 1 mm in an electrically conductive paste "Dotite" manufactured by Fujikura Kasei K. K. for 5 seconds, thereafter, the sample was air dried for one hour and electrodes are attached (attached to diagonal lines). After moisture conditioning the sample thus prepared at a temperature of 25° C. and a relative humidity of 10% for 2 hours, the resistance between the electrodes is measured. The resistant value obtained is multiplied by the length (5) coated with Dotite and divided by the distance (1.5) between Dotites to provide the side resistant value.

The electric resistance (lateral resistance) of the electrically conductive layer containing the electrically conductive metal oxide in the invention is preferably lower and it is the feature that the resistance at 25° C. and a relative humidity of 10% is not higher than $10^{11}$, and is preferably not higher than $10^{10}Ω$, and more preferably not higher than $10^{9}Ω$. When the electric resistance at 25° C. and a relative humidity of 10% is not higher than $10^{11}Ω$, the faults caused by exposing of the light-sensitive layer by discharging the electrostatic charges accumulated on the heat-developable light-sensitive material before the heat development treatment, which results in causing spots and resin-form mottled lines after development treatment and the faults of attracting dusts by the accumulated electrostatic charges at printing, which appear one the images formed can be prevented. Furthermore, the occurrence of the conveying trouble by electrostatic charging of the heat-developable light-sensitive material can be prevented.

In the invention, in addition to the electrically conductive layer containing the electrically conductive metal oxide, an electrically conductive layer containing an ionic conductive polymer or latex, or an ionic surface active agent may be newly formed. The electrostatic conductive layer may be formed at the emulsion layer side or the back side. For example, there are a protective layer, an interlayer, an emulsion layer, a UV-preventing layer an antihalation layer, a subbing layer, a back layer, and a back-protective layer. In these layers, the preferred layers are the protective layer, the interlayer, the antihalation layer, the subbing layer, the back layer, and the back-protective layer. As the effect of preventing the heat-developable light-sensitive material from attracting dusts before the development treatment, the deficiency of preventing the heat-developable light-sensitive material from being light exposed by discharging of electrostatic charges before the development treatment can be supplemented by the electrically conductive layer containing an ionic electrically conductive polymer or latex. There is no particular restriction on the ionic electrically conductive polymer or latex, and they may be anionic, cationic, betainic, or nonionic, but anionic and cationic are preferred. More preferable ones are anionic sulfonic acid-base, carboxylic acid-base, and phosphoric acid-base polymers or latexes or tertiary amine-base, quaternary ammonium-base, and phosphonium-base ones. These electrically conductive polymers or latexes include, for example, the anionic polymers or latexes described in JP-A-48-22017, JP-B-46-24159, JP-A-51-30725, JP-A-51-129216, JP-A-55-95942, JP-B-52-25251, JP-A-51-29923, and JP-B-60-48024; and the cationic polymers or latexes described in JP-A-48-91165, JP-A-49-121523, JP-B-49- 24582, JP-B-57-18176, JP-B-57-56059, JP-B-58-56856 and U.S. Pat. No. 4,118,231, etc.

Also, practical examples of the ionic surface active agent are described in JP-A-49-85826, JP-A-49-33630, JP-A-48-87826, JP-B-49-11567, JP-B-49-11568, JP-55-70837, U.S. Pat. Nos. 2,992,108, 3,206,312, etc.

To the electrically conductive layer containing the electrically conductive metal oxide and the electrically conductive layer containing the ionic electrically conductive polymer or latex, or the ionic surface active agent may be added a heat-resisting agent, a weather resisting agent, inorganic particles, a water-soluble resin, an emulsion, etc., for matting or improving the film quality in the range of hindering the antistatic property. For example, into the electrically conductive layer containing the electrically conductive metal oxide may be added inorganic fine particles. The inorganic fine particles, which can be added, include silica, colloidal silica, alumina, alumina sol, kaolin, talc, mica, calcium carbonate, etc. The mean particle size of the fine particles is preferably 0.01 to 10 μm, and more preferably 0.01 to 5 μm, and the content of the fine particles is preferably 0.05 to 10 parts, and particularly preferably 0.1 to 5 parts by weight to 100 parts by weight of the solid components in the coating liquid.

In the heat-developable light-sensitive material of the invention, it is a feature that the sum total of the organic silver salt and the light-sensitive silver halide is 1 to 2 $g/m^2$ in terms of Ag, and the sum total is more preferably 1 to 1.8 $g/m^2$, and particularly preferably 1 to 1.6 $g/m^2$. Because in the heat-developable light-sensitive material, which does not require fixing, after heat development, the organic silver salt, the organic acid, and the silver halide remain in the films, when the amounts thereof are large, the transmitting light is shaded. Also, because at least one kind of a crystalline metal oxide selected from ZnO, $TiO_2$, $SnO_2$, $Al_2O_3$, $In_2O_3$, $SiO_2$, MgO, BaO, and $MoO_3$ or a composite oxide of them also shade the transmitting light, when both materials are used together for preparing the heat-developable light-sensitive material excellent in the antistatic faculty, it is very important for designing goods to control the sum total Ag amounts of the organic silver salt and the silver halide.

The Ag amount ratio of the organic silver salt to the silver halide, which can be used in the invention, is preferably 1:1 to 20:1, and more preferably 5:1 to 15:1.

The organic silver salt, which can be used in the invention, is a silver salt, which is relatively stable to light but forms a silver image in the case of being heated at 80° C. or higher in the presences of a light-exposed light catalyst (an electrostatic latent image of a light-sensitive silver halide, etc.) and a reducing agent. The organic silver salt may be an optional organic material containing a source, which can reduce a silver ion. A silver salt of an organic acid, and particularly, the silver salt of a long chain carboxylic acid (having a carbon atom number of 10 to 30, preferably 15 to 28) is preferred. A complex of an organic or inorganic silver salt having a complex stability constant, wherein the legend is in the range of 4.0 to 10.0, is also preferable. The preferred inorganic silver salt includes a silver salt of an organic compound having a carboxyl group. Examples of these silver salts include the silver salts of aliphatic carboxylic acids and the silver salts of aromatic carboxylic acids, but they are not limited to these silver salts. Preferred examples of the silver salt of an aliphatic carboxylic acid include silver behenate, silver stearate, silver oleate, silver laurate, silver caproate, silver myristate, silver palmitate, silver maleate, silver fumarate, silver tartrate, silver linolate, silver camphorate, and mixtures of them.

The silver salts of compounds containing a mercapto group or a thion group and the derivatives of them can be also used. Preferred examples of these compounds include the silver salt of 3-mercapto-4-phenyl-1,2,4-triazole, the silver salt of 2-mercaptobenzimidazole, the silver salt of 2-mercapto-5-aminothiadizole, the silver salt of 2-(ethylglycolamido)benzothiazole; the silver salts of thioglycollic acid such as the silver salt of S-alkylthioglycollic acid (wherein, the carbon atom number of the alkyl group is 12 to 22), etc.; the silver salts of dithiocarboxylic acid such as the silver salt of dithioacetic acid, etc.; the silver salt of thioamide, the silver salt of 5-carboxyl-1-methyl-2-phenyl-4-thiopyridine, the silver salt of mercaptotriazine, the silver salt of 2-mercaptobenzoxazole, the silver salts described in U.S. Pat. No. 4,123,274, for example, the silver salts of 1,2,4-mercaptothiazole derivatives, such as the silver salt of 3-amino-5-benzylthio-1,2,4-thiazole, etc.; and the silver salts of the thion compounds, such as the silver salt of 3-(3-carboxyethyl)-4-methyl-4-thiazolin-2-thion, etc., described in U.S. Pat. No. 3,301,678. Furthermore, a compound containing an imino group can be also used. More preferred examples of these compounds include the silver salts of benzotriazoles and the derivatives thereof, for example, the silver salt of a benzotriazole, such as methylbenzotriazole silver, etc., the silver salt of a halogen-substituted benzotriazole, such as 5-chlorobenzotriazole silver, etc.; and the silver salt of 1,2,4-triazole or 1-H-tetrazole, and the silver salts of imidazole and the imidazole derivatives, etc., described in U.S. Pat. No. 4,220,709. Furthermore, the various silver acetylide compounds described in U.S. Pat. Nos. 4,761,361 and 4,775,613 can be also used.

There is no particular restriction on the form of the organic silver salt, which can be used in the invention, but acicular crystals each having a short axis and a long axis are preferred. As well-known in the field of photographic silver halide light-sensitive materials, the inverse proportional relation between the sizes of the silver salt crystal particles and the covering power exists in the heat-developable light-sensitive material of the invention. That is, because large organic silver salt particles, which are the image-forming member of the heat developable light-sensitive material, mean that the covering power becomes small and the image density is lowered, it is necessary that the sizes of the silver salt particles are small. In the invention, it is preferred that the short axis of the organic silver salt or the acicular crystal is 0.01 μm to 0.20 μm and the long axis is 0.10 μm to 5.0 μm, and it is more preferred that the short axis is 0.01 μm to 0.15 μm, and the long axis is 0.10 μm to 4.0 μm. Also, the particle size distribution of the organic silver salt particles is a monodisperse. The monodispersed distribution means that the percentage of the value obtained by dividing the standard deviation of each length of the short axis and the long axis by each of the short axis and the long axis is preferably not larger than 100%, more preferably not larger than 80%, and far more preferably not larger than 50%.

As the measurement method of the form of the organic silver salt, the form can be obtained by the transmission type electron microscopic image of the organic silver salt dispersion. As other method of measuring the monodispersibility, there is a method of obtaining the standard deviation of the volume load average diameter of the organic silver salt, and the percentage (coefficient of variation) of the value divided by the volume load average diameter is preferably not larger than 100%, more preferably not larger than 80%, and far more preferably not larger than 50%. As the measurement method, for example, the organic silver salt dispersed in a liquid is irradiated by a laser light, and the monodispersibility can be obtained from the particle size (volume load average diameter) obtained by determining the self correlation function to the time change of the fluctuation of the scattered light.

The formation method of the light-sensitive silver halide in the invention is well known in the field of the art, and for example, the methods described in "Research Disclosure", No. 17029, June, 1978 and U.S. Pat. No. 3,700,458 can be used. As a practical method used in the invention, a method that by adding a halogen-containing compound to an organic silver salt prepared a part of silver of the organic silver salt is converted to a light-sensitive silver halide and a method wherein by adding a silver0supplying compound and a halogen-supplying compound to a solution of gelatin or other polymer, light-sensitive silver halide grains are prepared and the silver halide grains are mixed with an organic silver salt can be used. In the invention, the latter method can be preferably used. It is preferred for restraining low the occurrence of the white turbidity after image formation that the grain sizes of the light-sensitive silver halide grains are preferably small and practically it is better that the grain sizes are preferably 0.0001 $\mu$m to 0.15 $\mu$m, and more preferably 0.02 $\mu$m to 0.12 $\mu$m. When the grain sizes of the light-sensitive silver halide grains are too small, the sensitivity becomes deficient, while when the grain sizes are too large, a problem of increasing haze of the heat-developable light-sensitive material sometimes occurs. In this case, when the silver halide grains are so-called normal crystal such as a cube or an octahedron, the grain size is the length of the edge of the silver halide grain. Also, when the silver halide grains are tabular grains, the grain size is the diameter in the case of converting the circle image having the same area as the projected area of the main surface thereof. In other case of not the normal crystal, for example, when the silver halide grains are spherical grains, rod-form grains, the grain size is the diameter in the case of considering a sphere having the same volume as that of the silver halide grain.

As the form of the silver halide grains, there are a cube, an octahedron, a tabular grain, a spherical grain, a rod-form grain, a potato-form grain, etc., but in the invention, cubic grains and tabular grains are particularly preferred. In the case of tabular silver halide grains, it is better that the mean aspect ratio is preferably 100:1 to 2:1, and more preferably 50:1 to 3:1. Furthermore, the silver halide grains having round corners can be preferably used. There is no particular restriction on the index of a plane (Miller indices) of the outer surface of the light-sensitive silver halide grain but it is preferred that ratio of occupying the {100} plane having the spectral sensitizing efficiency in the case of adsorbing a spectral sensitizing dye is high. The ratio is preferably at least 50%, more preferably at least 65%, and far more preferably at least 80%. The ratio of the Miller indices, {100} plane can be obtained by the method of utilizing the adsorption reliance of the {111} plane and the {100} plane in the adsorption of a sensitizing dye described in T. Tani; "J. Imaging Sci.", 29, 165 (1985). There is no particular restriction on the halogen composition of the light-sensitive silver halide, and silver chloride, silver chlorobromide, silver bromide, silver iodobromide, silver iodochlorobromide, or silver iodide may be used but in the invention, silver iodide or silver iodobromide can be preferably used. Particularly, silver iodobromide is preferred and in this case, the content of silver iodide is preferably 0.1 mol % to 40 mol %, and more preferably 0.1 mol % to 20 mol %. The distribution of the halogen composition in the light-sensitive silver halide grains may be uniform, or the halogen composition may be stepwise changed or may be continuously changed, but as a preferred example, the silver iodobromide grains having a high silver iodide content in the inside of the grains can be used. Also, preferably, the silver halide grains having a core/shell structure can be used. As the structure, the core/shell grains of preferably the 2- to 5-fold structure and more preferably 2- to 4-fold structure can be used.

It is preferred that the light-sensitive silver halide grains used in the invention contains at least one kind of a complex of a metal selected from rhodium, rhenium, ruthenium, osmium, iridium, cobalt, mercury, and iron. The metal complex may be used as one kind or two or more kinds of the complexes of the same metal or different metals may be used. The content of the complex is in the range of preferably 1 nmol to 10 mmol, and more preferably 10 nmol to 100 $\mu$mol. As the practical structure of the metal complex, the metal complexes of the structures described in JP-A-7-225449 can be used. As the compounds of cobalt or iron, hexa-cyano metal complexes can be preferably used. Practical examples thereof include a ferricyanate ion, a ferrocyanate ion, a hexacyanocobalt acid ion, etc., but the invention is not limited to these compounds. The containing phase of the metal complex in the silver halide may be uniform, the metal complex is contained in the core portions at a high concentration, or is contained in the shell portions at a high concentration, and there is no particular restriction.

The light-sensitive silver halide grains may be subjected to desalting by a water-washing method known in the field of the art, such as a noodle method, a flocculation method, etc., but in the invention, desalting may be emitted.

It is preferred that the light-sensitive silver halide grains in the invention are chemically sensitized. As a preferred chemical sensitizing method, a sulfur sensitizing method, a selenium sensitizing method, or a tellurium sensitizing method well-known in the field of the art can be used. Also, a noble metal sensitizing method using a gold compound, platinum, palladium, an iridium compound, etc., and a reduction sensitizing method can be also used. As the compounds preferably used for the sulfur sensitizing method, the selenium sensitizing method, or the tellurium sensitizing method, known compounds can be used but the compounds described in JP-A-7-128768, etc., can be used.

The tellurium sensitizer used for the tellurium sensitizing method includes, for example, diacyl tellurides, bis (oxycarbonyl) tellurides, diacyl ditellurides, bis (oxycarbonyl) ditellurides, bis (carbamoyl) ditellurides, compounds having a P═Te bond, tellurocarboxylates, Te-organyltellurocarboxylic acid esters, di(poly)tellurides, tellurides, tellroles, tellurolacetals, tellurosulfonates, compounds having P—Te bond, Te-containing heterocyclic compounds, tellurocarbonyl compounds, inorganic tellurium compounds, and colloidal tellurium.

Examples of the compound preferably used for the noble metal sensitizing method include chloroauric acid. potassium chloroaurate, potassium auriothiocyanate, gold sulfide, gold selenide, and the compounds described in U.S. Pat. No. 2,448,060 and British Patent No. 618,061. Practical examples of the compound used for the reduction sensitizing method include stannous chloride, aminoiminomethanesulfinic acid, hydrazine derivatives, borane compounds, silane compounds, and polyamine compounds, also, by ripening the emulsion by maintaining the pH of the emulsion at 7 or lower or pAg at 8.3 or lower, the reduction sensitization can be carried out. Also, by introducing a single addition portion of a silver ion during the formation of the silver halide grains, the reduction sensitization can be carried out.

The using amount of the light-sensitive silver halide in the invention is preferably 0.01 mol to 0.5 mol, more preferably 0.02 mol to 0.3 mol. and particularly preferably 0.03 mol to 0.25 mol per 1 mol of the organic silver salt.

As the mixing method of the light-sensitive silver halide grains and the organic silver salt separately prepared and the mixing condition therefor, there are a method of mixing them by a high-speed stirrer, a ball mill, a sand mill, a colloid mill, a vibration mill, a homogenizer, etc., and a method of adding a light-sensitive silver halide prepared during the preparation of an organic silver salt followed by finishing the preparation of the organic silver salt. There is no particular restriction on the method if the effect of the invention is sufficiently obtained.

As a method of preparing the silver halide used in the invention, a so-called halidation method of halogenizing a part of silver of an organic silver salt with an organic or inorganic halide is preferably used. As the organic halide used in the above method, any compounds, which form a silver halide by reacting with the organic silver salt, can be used, and there are N-halogenoimides (N-bromosuccinimide, etc.), halogenated quaternary nitrogen compounds (tetrabutylammonium bromide, etc.), the associate of a halogenated quaternary nitrogen salt and a halogen molecule (pyridinium perbromide), etc. As the inorganic halogen compound, any compounds forming a silver halide by the reaction with the organic silver salt may be used, and there are halogenated alkali metals or ammonium (such as, sodium chloride, lithium bromide, potassium iodide, ammonium bromide, etc.), halogenated alkaline earth metals (calcium bromide, magnesium bromide, etc.), halogenated transition metals (such as, ferric chloride, ferric bromide, etc.), metal complexes having a halogen ligand (sodium iridate bromide, ammonium rhodium chloride, etc.), halogen atoms (bromine, chlorine, iodine), etc. Also, a desired organic or inorganic halide may be used together.

The addition amount of the halide in the case of carrying out the halidation in the invention is preferably 1 mmol to 500 mmol, and more preferably 10 mmol to 250 mmol per 1 mmol of the organic silver salt.

As the sensitizing dye used in the invention, any dyes, which can spectrally sensitize the silver halide grains at a desired wavelength region when adsorbed to the silver halide grains, can be used- Examples of the sensitizing dye used in the invention include cyanine dyes, merocyanine dyes, complex cyanine dyes, complex merocyanine dyes, holopolar cyanine dyes, styryl dyes, hemicyanine dyes, oxonole dyes, and hemioxonole dyes. The useful sensitizing dyes used in the invention are described in "Research Disclosure", Item 17643, IV-A, page 23, December, 1978, "ibid.", Item 1831 X, page 437, August, 1979, and the literatures cited therein. Particularly, the sensitizing dyes having spectral sensitivities suitable for the spectral characteristics of various kinds of laser imagers, scanners, and image setters.

Particularly preferred one having the structures of the dyes used in the invention include the cyanine dyes having a thioether bond-containing substituent (for example, the dyes described in JP-A-62-58239,JP-A-3-138638, JP-A-3-138642, JP-A-4-255840, JP-A-5-72659, JP-A-5-72661, JP-A-6-222491, JP-A-2-230506, JP-A-6-258757, JP-A-6-317868, JP-A-6-324425, JP-W-7-500926 (The term "JP-W" as used herein means an "international patent application published in the Japanese national proceeding"), and U.S. Pat. No. 5.541.054), the dyes having a carboxylic acid group (for example, the dyes described in JP-A-3-163440, JP-A-6-301141, and U.S. Pat. No. 5,441,899), and the merocyanine dyes, polynuclear merocyanine dyes, and the polynuclear cyanine dyes (for example, the dyes described in JP-A-47-6329, JP-A-49-105524, JP-A-51-127719, JP-A-52-80829, JP-A-54-61517, JP-A-59-214846, JP-A-60-6750, JP-A-63-159841, JP-A-6-35109, JP-A-6-59381, JP-A-7-146537, JP-A-7-146537, JP-W-55-50111, British Patent 1.467,638, and U.S. Pat. No. 5,281,515).

These sensitizing dyes may be used singly or as a combination of two or more kinds thereof. A combination of sensitizing dyes is, in particularly, frequently used for the purpose of a super sensitization. The emulsion used in the invention may contain, together with the sensitizing dye, a dye having no spectral sensitizing function by itself or a substance which does not substantially absorb a visible light and shows a super sensitization. Useful sensitizing dyes, the combination thereof and the dye showing a super sensitization, and the substances showing a super sensitization are described in "Research Disclosure", Vol. 176, 17643, page 23, IV-J (published December, 1978), JP-B-49-25500, JP-B-43-4933, JP-A-59-19032 and JP-A-59-192242.

The sensitizing dyes used in the invention may be used singly or as a combination of two or more kinds of them. For adding the sensitizing dye to a silver halide emulsion, the sensitizing dye may be added directly in the emulsion or is dissolved in a solvent such as water, methanol, ethanol, propanol, acetone, methyl cellosolve, 2,2,3,3-tetrafluoropropanol, 2,2,2-trifluoroethanol, 3-methoxy-1-propanol, 3-methoxy-1-butanol, 1-methoxy-2-propanol, N,N-dimethylformamide, etc., singly or as a mixture thereof and may be added to the emulsion.

Also, the method of dissolving the dye in a volatile organic solvent, dispersing the solution in water or a hydrophilic colloid, and adding the dispersion to an emulsion as disclosed in U.S. Pat. No. 3,469,987; the method of dissolving the dye in an acid and adding the solution to an emulsion or the method of adding the dye to an emulsion as an aqueous solution thereof with the existence of an acid or a base as disclosed in JP-B-44-23389, JP-B-44-27555, JP-B-57-22091, etc.; the method of adding the dye to an emulsion as an aqueous solution or a colloid dispersion with the existence of a surface active agent as disclosed in U.S. Pat. Nos. 3,822,135 and 4,006,025; the method of directly dispersing the dye in a hydrophilic colloid and adding the dispersion to an emulsion as disclosed in JP-A-53-102733 and JP-A-58-105141: and the method of dissolving the dye using a compound of red-shifting and adding the solution to an emulsion as disclosed in JP-A-51-74624 can be used in the invention. Also, a ultrasonic wave can be applied to the solution of the dye.

The time of adding the sensitizing dye used in the invention to the silver halide emulsion may be any step of the preparation of the silver halide emulsion, which has been confirmed to be useful. For example, there are the time of the step of forming silver halide grains and/or before desalting or the time of the step of desilvering and/or of after desalting and before the initiation of chemical ripening as disclosed in U.S. Pat. Nos. 2,735,766; 3,628,960; 4,183,756; and 4,225,666; JP-A-58-184142 and JP-A-60-196749, etc.; and the time of directly before chemical ripening or the step of chemical ripening as disclosed in JP-A-58-113920, etc. That is, the dye may be added to any time after chemical ripening of the silver halide emulsion and before coating the emulsion. Also, as disclosed in U.S. Pat. No. 4,225,666 and JP-A-58-7629, the same compound singly or as a combination with a compound having a different structure may be added separately, for example, in the step of forming the silver halide grains and the step of chemical ripening or after finishing chemical ripening, or may be added separately before or in the step of the chemical ripening and after finishing chemical ripening, or furthermore, the kinds of the compounds or the combination of the compounds separately added may be changed.

The using amount of the sensitizing dye in the invention may be selected desirably according to the faculty of the sensitivity, the formation of fog, etc., but is preferably $10^{-6}$ to 1 mol, and more preferably $10^{-4}$ to $10^{-1}$ per 1 mol of the silver halide in the light-sensitive layer.

The reducing agent for the organic silver salt used in the invention may be an optional substance, and preferably an organic substance capable of reducing a silver ion to metallic silver. As the reducing agent, ordinary photographic developing agents such as phenidone, hydroquinone, catechol, etc., are useful but a hindered phenol reducing agent is preferred. The content of the reducing agent is preferably 5 to 50 mol, and more preferably 10 to 40 mol per 1 mol of silver in the emulsion layer. The addition layer of the reducing agent may be any layer on the support of the side of having the emulsion layer. When the reducing agent is added to other layer than the emulsion layer, it is preferred that the content thereof is larger as 10 to 50 mol to 1 mol of silver of the emulsion layer. Also, the reducing agent maybe a so-called the precursor thereof induced to have the effective function at the development only.

In the heat-developable light-sensitive material Utilizing the organic silver salt, the reducing agents of a wide range are disclosed in JP-A-46-6074, JP-A-47-1238, JP-A-47-33621, JP-A-49-46427, JP-A-49-115540, JP-A-50-14334, JP-A-50-36110, JP-A-50-147711, JP-A-51-32632, JP-A-51-1023721, JP-A-51-32324, JP-A-51-51933, JP-A-52-84727, JP-A-55-108654, JP-A-56-146133, JP-A-57-82828, JP-A-57-82829, JP-A-6-3793, U.S. Pat. Nos. 3,667,958, 3,679,426, 3,751,252, 3,751,255, 3,761,270, 3,782,949, 3,839,048, 3,928,686, and 5,464,738, German Patent 2321328, European Patent 692732, etc.

Examples of the reducing agent include amidoximes such as phenylamidoxime, 2-thienylamidoxime, p-phenoxyphenylamidoxime, etc.; azines such as 4-hydroxy-3,5-dimethoxybenzaldehydeazine, etc.; a combination of an aliphatic carboxylic acid arylhydrazide and ascorbic acid, such as a combination of 2,2'-bis(hyroxymethyl)propionyl-β-phenylhydrazine and ascorbic acid, etc.; a combination of polyhydroxybenzene, hydroxylamine, redactone and/or hydrazine (for example, a combination of hydroquinone, bis(ethoxyethyl) hydroxylamine, and piperidinohexosereductone or hormyl-4-methylphenylhydrazine, etc.); hydroxamic acids such as phenylhydroxamic acid, p-hydroxyphenylhydroxamic acid, β-anilinehydroxamic acid, etc.; a mixture of azine and sulfoneamidophenol (for example, a combination of phenothiazine and 2,6-dichloro-4-benzenesulfonamide, etc.); α-cyanophenyl acetic acid derivatives such as ethyl-α-cyano-2-methylphenylacetate, ethyl-α-cyanoaophenylacetate, etc.; bis-β-naphthols such as 2,2'-dihydroxy-l,1'-binaphthyl, 6,6'-dibromo-2,2'-dihydroxy-1,1-binaphthyl, bis (2-hydroxy-1-naphthyl)methane, etc.; a combination of bis-β-naphthol and a 1, 3-dihydroxybenzene derivative (for example, a combination of bis-β-naphthol and 2,4-dihydroxybenzophenone or 2',4'-dihydroxyacetophenone, etc.); 5-pyrazolones such as 3-methyl-1-phenyl-5-pyrazolone; reductones such as dimethylaminohexosereductone, anhydrodihydroaminohexosereductone, anhydrodihydropiperidonehexosereductone, etc.; sulfonamidophenol reducing agents such as 2,6-dichloro-4-benzenesulfonamidophenol, p-benzenesulfonamidophenol, etc.; 2-phenylindane-1,3-dione, etc.; chromans such as 2,2-dimethyl-7-tert-butyl-6-hydroxychroman, etc.; 1,4-dihydrpyridines such as 2,6-dimethoxy-3,5-dicarboethoxy-1,4-dihydropyridine, etc.; bisphenols (for example, 2-hydroxy-3-tert-butyl-5-methylphenyl)methane. 2.2-bis(4-hydroxy-3-methylphenyl)propane, 4,4-ethylidene-bis(2-tert-butyl-6-methylphenol), 1,1-bis(2-hydroxy-3,5-dimethylphenyl)-3,5,5-trimethylhexane, 2,2-bis(3,5-dimethyl-4-hydroxyphenyl)propane, etc.); ascorbic acid Derivatives (for example, 1-ascorbyl palmitate, ascorbyl stearate, etc.); aldehydes and ketones such as benzyl, acetyl, etc.; 3-pyrazolidone and a certain kind of indane-1,3-dione; and chromanol (tocopherol, etc.). The particularly preferred reducing agents are bisphenols and chromanols.

In the invention, when an additive known as "color-toning agent" of improving image quality is contained, the optical density is sometimes increased. Also, the color-toning agent is sometimes useful for forming a black silver image. The color-toning agent is contained in a layer on the support of the side of having an emulsion layer in an amount of preferably 0.1 to 50 mol, and more preferably 0.5 to 20 mol per 1 mol of silver. Also, the color-toning agent may be a so-called precursor induced of having an effective function at development only.

In the heat-developable light-sensitive material utilizing the organic silver salt, color-toning agents of a wide range are disclosed in JP-A-46-6077, JP-A-47-10282, JP-A-49-5019, JP-A-49-5020, JP-A-49-91215, JP-A-49-91215, JP-A-50-2524, JP-A-50-32927, JP-A-50-67132, JP-50-67641, JP-A-50-114217, JP-A-51-3223, JP-A-51-27923, JP-A-52-14788, JP-A-52-99813, JP-A-53-1020, JP-A-53-76020, JP-A-54-156524, JP-A-54-156525, JP-A-61-183642, JP-A-4-56848, JP-A-10-339928, JP-A-10-339930, JP-A-10-339931, JP-A-11-52511, JP-B-49-10727, JP-B-54-20333, U.S. Pat. Nos. 3,080,254, 3,446,648, 3,782,941, 4,123,282, and 4,510,236, British Patent 1380795, Belgian Patent 841910, etc. Examples of the color-toning agent include phthalimide and N-hydroxyphthalimide; cyclic imides such as succinimide, pyrazolin-5-one, and quinazolinone, 2,4-thiazolizinedione, etc.; naphthalimides (for example, N-hydroxy-1,8-naphthalimide, etc.); cobalt complexes (for example, cobalt hexamine trifluoroacetate); mercaptans such as 3-mercapto-4,5-diphenyl-1,2,4-triazole, 2,5-dimercapto-1,3,4-thiadiazole, etc.); N-(aminomethyl) aryldicarboxyimides (for example, (N,N-dimethylaminomethyl)phthalimide and N,N-(dimethylaminomethyl)-naphthalene-2,3-dicarboxyimide); blocked pyrazoles, isothiuronium derivatives, and a certain kind of light fading agents (for example, N,N'-hexamethylene bis(1-carbamoyl-3,5-dimethylpyrazole) and 2-tribromomethylsulfonyl)-(benzothiazole)); 3-ethyl- 5[(3-ethyl-2-benzothiazolinilidene)-1-methylethyldene]-2-thio-2,4-oxazolidinedione; phthalazinone, phthalazinone derivatives or metal salts, or the derivatives such as 4-(1-naphthyl) phthalazinone, 6-chlorophthalazinone, 5,7-dimethoxyphthalazinone, and 2,3-dihydro-1,4-phthaldinedione, etc.; combinations of phthalazinone and phthalic acid derivatives (for example, phthalic acid, 4-methylphthalic acid, 4-nitrophthalic acid, and tetrachlorophthalic anhydride); phthalazine, phthalazine derivatives or metal salts, or the derivatives such as 4-(1-naphhyl) phthalazine, 6-chlorophthalazine, 5,7-dimethoxyphthalazine, and 2,3-dihydrophthalzine, etc.; combinations of phthalazine and phthalic acid derivatives (for example, phthalic acid, 4-methylphthalic acid, 4-nitrophthalic acid, and tetrachlorophthalic anhydride); quinazolinedione, benzoxazine, and naphthoxazine derivatives; rhodium complexes functioning not only as color toning controlling agent but also as the source of a halide ion for forming a silver halide on the spot, such as, for example, hexachlororhodium (III) acid ammonium, rhodium bromide, rhodium nitrate, and hexachlororhodium (III)acid potassium, etc.; inorganic peroxides and persulfate, such as ammonium disulfide peroxide and hydrogen peroxide; benzoxazine-2,4-diones such as 1,3-benzoxazine-2,4-dione, 8-methyl-1,3-benzoxazine- 2,4-dione, and 6-nitro-1,3-benzoxazine-2,4-dione; pyrimidine and asymmetric-triazine (for example, 2,4-dihydroxypyrimidine, 2-hydroxy-4-aminopyrimidine, etc.); azauracil, and tetraazapentalene derivatives (for example, 3,6-dimercapto-1,4-diphenyl-1H, 4H-2,3a,5,6a-tetraazapentalene, and 1,4-di(o-chlorophenyl)-3,6-dimercapto-1H,4H-2,3a,5,6a-tetra-azapentalene), etc.

As the binder for the emulsion layer in the invention, there are well-known natural or synthetic resins such as, for example, gelatin, polyvinyl acetal, polyvinyl chloride, polyvinyl acetate, cellulose acetate, polyolefin, polyester, polystyrene, polyacrylonitrile, and polycarbonate. As the matter of course, copolymers and terpolymers are included. Preferred polymers and copolymers include polyvinyl butyral, butylethyl cellulose, a methacrylate copolymer, a maleic anhydride copolymer, polystyrene, and a butadiene-styrene copolymer. If necessary, two or more kinds of the polymers and copolymers can be used as a combination of them. Such a polymer or copolymer is used in a sufficient amount for holding other components therein. That is, they can be used in the effective range for functioning as a binder.

The effective range can be properly determined by a person skilled in the art. As the standard in the case of holding at least the organic silver salt, the ratio of the binder to the organic silver salt is in range of 15:1 to 1:3, and preferably 8:1 to 1:2 by weight ratio.

The silver halide emulsion and/or the organic silver salt in the invention can be further protected to the additional formation of fog by the addition of a antifogging agent, a stabilize, and a stabilizer precursor, and in this case, they can be stabilized to lowering of the sensitivity during storage. The proper antifogging agent, stabilizer, and stabilizer precursor, which can be used singly or as a combination of them include the thiazonium salts described in U.S. Pat. Nos. 2,131,038 and 2,694,716; the azaindenes described in U.S. Pat. Nos. 2,886,437 and 2,444,606; the mercury salts described in U.S. Pat. No. 2,728,663; the urazols described in U.S. Pat. No. 3,287,135; the sulfocatechols described in U.S. Pat. No. 3,235,652; the oxime, the nitron, and the nitroindazole described in British Patent 623,448; the polyvalent metal salts described in U.S. Pat. No. 2,839,405; the thiuronium salts described in U.S. Pat. No. 3,220,839; the palladium, platinum, and gold salts described in U.S. Pat. Nos. 2,566,263 and 2,597,915; the halogen-substituted organic compounds described in U.S. Pat. No. 4,42,202; the triazines described in U.S. Pat. Nos. 4,128,557, 4,137,079, 4,138,365, and 4,459,350, and the phosphorus compounds described in U.S. Pat. No. 4,411,985.

The antifogging agents preferably used in the invention are organic halides and examples of the organic halides are the compounds disclosed in JP-A-50-119624, JP-A-50-120328, JP-A-51-121332, JP-A-54-58022, JP-A-56-70543, JP-A-56-99335, JP-A-59-90842, JP-A-61-129642, JP-A-62-129845, JP-A-6-208191, JP-A-7-5621, JP-A-7-2781, JP-A-8-15809, JP-A-9-160167, JP-A-9-244177, JP-A-9-244178, JP-A-9-258367, JP-A-9-265150, JP-A-9-319022, JP-A-10-171063, JP-A-11-212211, JP-A-11-231460, JP-A-11-242304, U.S. Pat. Nos. 5,340,712, 5,369,000, and 5,464,737.

Although it is unnecessary for the practice of the invention, it is sometimes useful to add a mercury (II) salt to the emulsion layer as an antifogging agent. The preferred mercury (II) salts for the purpose are mercury acetate and mercury bromide. The addition amount of the mercury used in the invention is in the range of preferably 1 nmol to 1 mmol, and more preferably 10 nmol to 100 μmol per 1 mol of silver coated.

The heat-developable light-sensitive material in the invention may contain benzoic acids for the purposes of increasing the sensitivity and preventing the formation of fog. The benzoic acids used in the invention may be any benzoic acid derivatives but as the examples of the preferred structures, there are the compounds described in U.S. Pat. Nos. 4,784,939 and 4,152,160, JP-A-9-281637, JP-A-9-329864, and JP-A-9-329865.

The benzoic acids may be added to any site of the heat-developable light-sensitive material, but the addition layer is preferably a layer of the support side having the light-sensitive layer, and it is more preferred to add the benzoic acid to a layer containing the organic silver salt. The addition time of the benzoic acid may be any step of the preparation of the coating liquid, and in the case of adding to the layer containing the organic silver salt, the benzoic acid may be added to any step from the preparation of the organic silver salt to the preparation of the coating liquid, but the step after the preparation of the organic silver salt to directly before coating is preferred. The addition method of the benzoic acid may be carried out by any method of adding as a powder, a solution, a fine particle dispersion. Also, the benzoic acid may be added as a solution thereof added with other additives such as the sensitizing dye, the reducing agent, the color-toning agent, etc. The addition amount of the benzoic acid may be desirably selected but is preferably 1 μmol to 2 mol, and more preferably 1 mmol to 0.5 mol per 1 mol of silver.

In the invention, for restraining or accelerating the development, for controlling the development, for improving the spectral sensitizing efficiency, and for improving the storage stability before and after the development, a mercapto compound, a disulfide compound, and a thion compound can be incorporated.

In the case of the mercapto compound in the invention, the compound may have any structure but the mercapto compound shown by Ar-SM or Ar-S-S-Ar (wherein M represents a hydrogen atom or an alkali metal atom and Ar represents an aromatic ring or a condensed aromatic ring having at leas one nitrogen, sulfur, oxygen, selenium, or tellurium) is preferred. As the preferred mercapto compound, the hetero-aromatic ring includes benzimidazole, naphthimidazole, benzothiazole, naphthothioazole, benzoxazole, naphthoxazole, benzoselenazole, benzotellurazole, imidazole, oxazole, pyrazoles, triazole, thiadiazole, tetrazole, triazine, pyrimidine, pyridazine, pyrazine, pyridine, purine, quinoline, and quinazoline. The hetero-aromatic ring may have a substituent selected from the group consisting of a halogen (e.g., Br and Cl), hydroxy, amino, carboxy, alkyl (e.g., an alkyl having at least one carbon atom, and preferably 1 to 4 carbon atoms), and alkoxy (e.g., an alkoxy having at least one carbon atom, and preferably 1 to 4 carbon atoms).

The mercapto-substituted aromatic compound includes 2-mercaptobenzimidazole, 2-mercaptobenzoxazole, 2-mercaptobenzothiazole, 2-mercapto-5-methylbenzimidazole, 6-ethoxy-2-mercaptobenzothiazole, 2,2'-dithiobis-(benzothiazole), 3-mercapto-1,2,4-triazole, 4,5-diphenyl-2-imidazolethiol, 2-mercaptoimidazole, 1-ethyl-2-mercaptobenzimidazole, 2-mercaptoquinoline, 8-mercatppurine, 2-mercapto-4(3H)-quinazolinone, 7-trifluoromethyl-4-quinolinethiol, 2,3,5,6-tetrachloro-4-pyridinethiol, 4-amino-6-hydroxy-2-mercaptopyrimidine monohydrate, 2-amino-5-mrcapto-1,3, 4-thiadiazole, 3-amino-5-mercapto-1,2,4-triazole, 4-hydroxy-2-mercaptopyrimidine, 2-mercaptopyrimidine, 4,6-diamino-2-mercaptopyrimidine, 2-mercapto-4-methylpyrimidine hydrochloride, 3-mercapto-5-phenyl-1,2,4-triazole, 2-mercapto-4-phenyloxazole, etc., but the invention is not limited to them.

The addition amount of the mercapto compound is in the range of preferably 0.001 to 1.0 mol, and more preferably 0.01 to 0.3 mol per 1 mol of silver in the emulsion layer.

For the light-sensitive layer in the invention, polyhydric alcohols (for example, the glecerols and diols of the kinds described in U.S. Pat. No. 2,960,404); the fatty acids and the esters described in U.S. Pat. Nos. 2,588,765 and 3,121,060; and the silicone resins described in British Patent 955,061 can be used as a plasticizer and a lubricant.

In the present invention, hydrazine derivatives may be used. In the case of using the hydrazine derivative in the invention, the compounds of the formula (I) described in JP-A-6-47961 are used. Practically, the compounds shown by I-1 to I-53 described in the specification of the above-described patent application are used.

Also, the hydrazine derivatives described below are preferably used.

That is, the compounds described in JP-B-6-77138, and practically the compounds described in the patent gazette, pages 3 and 4. The compound shown by the formula (I) described in JP-B-6-93082, practically the compounds 1 to 38 described in the patent gazette, pages 8 to 18. The compounds shown by the formula (4), the formula (5), and the formula (6) described in JP-A-6-230497, practically the compounds 4-1 to the compound 4-10 described in the gazette, pages 25 and 26, the compounds 5-1 to 5-42 described in the gazette, pages 28 to 36, and the compounds 6-1 to 6-7 described in the gazette, pages 39 and 40. The compound shown by the formula (1) and the formula (2) described in JP-A-6-289520, practically, the compounds 1-1) to 1-17) and 2-1) described in the gazette, pages 5 to 7. The compounds described in JP-A-6-313936, practically, the compounds described in the gazette, pages 6 to 19. The compounds described in JP-A-6-313951, practically, the compounds described in the gazette, pages 3 to 5. The compounds shown by the formula (I) described in JP-A-7-5610, practically, the compounds I-1 to I-38 described in the gazette, pages 5 to 10. The compounds shown by the formula (II) described in JP-A-7-77783, practically, the compounds II-1 to II-102 described in the gazette, pages 10 to 27. The compounds shown by the formula (H) and the formula (Ha) described in JP-A-7-104426, practically, the compounds H-1 to H-44 described in the gazette, pages 8 to 15. The compounds having an anionic group near the hydrazine group or having a nonionic group forming an intramolecular hydrogen atom with the hydrogen atom of the hydrazine, and the compounds shown by the formula (A), the formula (B), the formula (C), the formula (D), the formula (E), or the formula (F) described in JP-A-7-191007, practically the compounds N-1 to N-30 described in the gazette. The compounds shown by the formula (1) described in JP-A-7-191007, practically, the compounds D-1 to D-55 described in the gazette.

In the case of using a hydrazine-base nucleating agent, it can be used by dissolving a proper water-miscible organic solvent, for example, alcohols (methanol, ethanol, propanol, fluorinated alcohols), ketones (acetone, methyl ethyl ketone), dimethylformamide, dimethylsulfoxide, methyl cellosolve, etc.

Also, the nucleating agent is dissolved using an oil such as dibutyl phthalate, tricresyl phosphate, glyceryl triacetate, or diethyl phthalate or an auxiliary solvent such as ethyl acetate, cyclohexanone, etc., by an emulsion dispersing method already well known, and an emulsified dispersion thereof can be prepared by mechanically and used. Or by a method well-known as a solid dispersion method, the powder of a hydrazine derivative can be dispersed in water by a ball mill, a colloid mill, or ultrasonic wave and used.

In the case of using a hydrazine-base nucleating agent in the invention, the nucleating agent may be added to the silver halide emulsion layer or any layer of other hydrophilic colloid layers at silver halide emulsion layer side of the support but it is preferred to add to the silver halide emulsion layer or the hydrophilic colloid layer adjacent to the emulsion layer.

The addition amount of the nucleating agent in the invention is preferably 1 $\mu$mol to 10 mmol, more preferably 10 $\mu$mol to 5 mmol, and most preferably 20 $\mu$mol to 5 mmol.

In the heat-developable light-sensitive material of the invention, a surface protective layer may be formed for the purposes of preventing attaching of the emulsion layer, etc. For the surface protective layer, any attaching preventing agents may be used. Examples of the attaching preventing agent include a wax, silica particles, a styrene-containing elastomer block copolymer (for example, a styrene-butadiene-styrene copolymer and styrene-isoprene-styrene copolymer), cellulose acetate, cellulose acetate butyrate, cellulose propionate, and the mixture thereof.

The absorption of the light-sensitive silver halide grain-containing layer at an exposure wavelength is preferably 0.1 to 0.6, and more preferably 0.2 to 0.5. When the absorption is large, $D_{min}$ is increased, whereby images formed become hard to be distinguished, and when the absorption is small, the sharpness is reduced.

Fur imparting a light-absorbing property to the light-sensitive silver halide layer, any method may be used but the use of a dye is preferred. As the dye, any dyes satisfying the above-described absorption condition can be used and examples thereof include pyrazoloazole dyes, anthraquinone dyes, azo dyes, azomethine dyes, oxonole dyes, carbocyanine dyes, styryl dyes, triphenylmethane dyes, indoaniline dyes, indophenol dyes, and squalirium dyes. The dyes preferably used in the invention include anthraquinone dyes (for example, the compounds 1 to 9 described in JP-A-5-341441, the compounds 3-6 to 3-18 and 3-23 to 3-39 described in JP-A-5-165147), azomethine dyes (the compounds 17 to 47 described in JP-A-5-341441, etc.), indoaniline compounds (for example, the compounds 11 to 19 described in JP-A-5-289227, the compound 47 described in JP-A-5-341441, the compounds 2-10 to 2-11 described in JP-A-5-165147), azo dyes (the compounds 10 to 16 described in JP-A-5-341441), and squalirium dyes (the compounds 1 to 20 described in JP-A-10-104779, and the compounds 1a to 3d described in U.S. Pat. No. 5,380,635). As the addition method of the dye, any method of adding as the solution, the emulsion, the solid fine particle dispersion, and a state of being mordanted with a high molecular mordant. The using amount of the compound is determined by the desired absorption amount but is generally used in the range of 1 $\mu$g to 1 g per $m^2$.

In the invention, the absorption of a layer other than the light-sensitive layer at the exposure wavelength is preferably 0.1 to 3.0, and more preferably 0.3 to 2.0. The layer having the absorption at the exposure wavelength is preferably is a layer disposed at the opposite side of the support to the side having the light-sensitive layer or a layer disposed between the light-sensitive layer and the support.

When the light-sensitive silver halide grains used in the invention are spectrally sensitized to an infrared region, for imparting an absorption to other portion (or layer) than the light-sensitive layer, any method may be used but it is preferred that the absorption maximum at the visible region is controlled to 0.3 or lower. As the dye used for coloring, the same dyes as those which can be used for imparting the absorption to the light-sensitive silver halide layer can be used, and the dye may be same as or different from the dye used for the light-sensitive layer.

For imparting the absorption to other layer than the light-sensitive silver halide grain-containing layer, it is preferred to use a dye, which is decolorized by a heat treatment, a compound, which is decolorized by a heat treatment, or a combination of dyes decolorized. Examples of the colored layer, which is decolorized, are disclosed in JP-A-52-139136, JP-A-53-132334, JP-A-56-501480, JP-A -57-16060, JP-A-57-68831, JP-A-57-101835, JP-A-59-102436, JP-A-7-36145, JP-A-7-199409, JP-B-48-33692, JP-B-50-16648, JP-B-2-41734, U.S. Pat. Nos. 4,088,497, 4,283,487, 4,548,896, and 5,187,049. The using amount of the compound is determined by the desired absorption amount but in general, it is preferred to use in the range of 1 $\mu$g to 1 g per $m^2$.

For the emulsion layer or the protective layer for the emulsion layer in the invention, the light absorbing substances and the filter dyes as described in U.S. Pat. Nos. 3,253,921, 2,274,782, 2,527,583, and 2,956,879 can be used. Also, for example, the dyes can be mordanted as described in U.S. Pat. No. 3,282,699. The using amount of the filter dye is preferably 0.1 to 3, and particularly preferred 0.2 to 1.5 as the absorbance at the exposure wavelength.

The emulsion layer or the protective layer for the emulsion layer in the invention can contain a delustering agent such as starch, titanium dioxide, zinc oxide, silica, and the polymer beads containing the beads of the kinds described in U.S. Pat. Nos. 2,992,101 and 2,701,245. Also, there is no particular restriction on the matting extent of the emulsion surface if a star dust fault does not occur but the Beck smoothness is preferably 200 seconds to 10,000 seconds, and particularly preferably 300 seconds to 10,000 seconds.

The heat-developable photographic emulsion used in the invention is constituted by one layer or more layers on a support. When the emulsion is constituted by one layer, the layer must further contain the organic silver salt, the silver halide, the developing agent, the binder, and, if desired, additional materials such as the color-toning agent, coating aid, and other auxiliary agents. When the emulsion is constituted by two layers, a 1st emulsion layer (usually a layer adjacent to the support) contains the organic silver salt and the silver halide and a 2nd layer or both the layers must contain various other components. However, two layer constitution containing a single emulsion layer containing all the components and a protective top coat is considered. The construction of the multicolor heat-developable light-sensitive material may contain the combination of two layers about each color and as described in U.S. Pat. No. 4,708,928, all the components may be contained in a single layer. In the case of the heat-developable light-sensitive material of multi-dye and multicolor light sensitivity, each emulsion layer is generally held by distinguishing each other by using a functional or non-functional barrier layer between the light-sensitive layers as described in U.S. Pat. No. 4,460,681.

The heat-developable photographic light-sensitive material in the invention is a so-called one-side light-sensitive material having at least one light-sensitive layer containing the silver halide emulsion on one side of the support and having a back layer on the other side.

The heat-developable light-sensitive material of the invention may contain a matting agent for improving the conveying property. The matting agent is generally the fine particles of an organic or inorganic compound insoluble in water. As the matting agent, an optional matting agent can be used, and the materials well known in the field of the art, such as the organic matting agents described in U.S. Pat. Nos. 1,030,213, 2,701,245, 2,322,037, 3,262,782, 3,539,344, and 3,767,448 and the inorganic matting agents described in U.S. Pat. Nos. 1,260,772, 2,192,241, 3,257,206, 3,370,951, 3,523,022, and 3,769,020, etc., can be used.

Examples of the organic compounds preferably used as the matting agents are shown below. That is, examples of the water-dispersing vinyl polymer include polymethyl acrylate, polymethyl methacrylate, polyacrylonitrile, an acrylonitrile-$\alpha$-methylstyrene copolymer, polystyrene, a styrene-divinylbenzene copolymer, polyvinyl acetate, polyethylene carbonate, and polytetrafluoroethylene.

Examples of the cellulose derivative include methylcellulose, cellulose acetate, and cellulose acetate propionate. Examples of the starch derivative include carboxy starch, carboxynitrophenyl starch, and a urea-formaldehyde-starch reaction product. Also, gelatin cured by a known curing agent and cured gelatin as fine capsule hollow particles by corecerbation-cured can be also preferably used.

Examples of the inorganic compound, which is preferably used in the invention, include silicon dioxide, titanium dioxide, magnesium dioxide, aluminum oxide, barium sulfate, calcium carbonate, and silver chloride and silver bromide desensitized by a known method, a glass, and diatomaceous earth.

The matting agents described above can be used, if necessary, as a mixture of different kinds of matting agents. There are no particular restrictions on the size and the form of the matting agent, and the mattering agent having optional particle sizes can be used. Also, the particle size distribution of the matting agent may be narrow or broad. On the other hand, because the matting agent fives large influences on the haze and the surface gloss of the heat-developable light-sensitive material, it is preferred to make the size, the form, and the particle size distribution the states according to a necessary at the preparation of the matting agent or by mixing plural matting agents.

In the invention, the matting extent of the back layer is preferably 10 seconds to 250 seconds, and more preferably 50 seconds to 180 seconds as the Back smoothness.

In the invention, it is preferred that the matting agent is contained in the outermost surface layer of the heat-developable light-sensitive material, a layer functioning as the uppermost surface layer, or a layer adjacent to the uppermost surface layer, and also it is preferred that the matting layer is contained in a layer acting as a so-called protective layer.

A binder suitable for the back layer in the invention is transparent or translucent and is generally colorless, and there are natural polymers, synthetic resins, polymers and copolymers, and other mediums forming films. Examples of the binder include gelatin, gum Arabic, polyvinyl alcohol, hydroxyethyl cellulose, cellulose acetate, cellulose acetate butyrate, polyvinyl pyrrolidone, casein , starch, polyacrylic acid, polymethylmethacrylic acid, polyvinyl chloride, polymethacrylic acid, copoly(styrene-maleic anhydride), copoly (styrene-acrylonitrile), polyvinyl acetals (for example, polyvinyl formal and polyvinyl butyral), polyesters, polyurethanes, phenoxy resins, polyvinylidene chloride, polyepoxides, polyvinyl acetate, cellulose esters, and polyamides. The binder may be coated from an aqueous solution, an organic solvent solution, or an emulsion.

The heat-developable light-sensitive material of the invention may have a backside resistive heating layer as shown in U.S. Pat. Nos. 4,460,681 and 4,374,921.

For each layer such as the light-sensitive layer, the protective layer, the back layer, etc., constituting the heat-developable light-sensitive material of the invention, a curing agent may be used. Examples of the curing agent used in the invention include the polyisocyanates described in U.S. Pat. No. 4,281,060 and JP-A-6-208193, the epoxy compounds described in U.S. Pat. No. 4,791,042, and the vinylsulfone-base compounds described in JP-A-62-89048.

In the invention, a surface active agent may be used for the purposes of improving the coating property and the charging property. As the surface active agent, nonionic, anionic, cationic, and fluorine-base surface active agents can be properly used. Practically, there are the fluorine-base high molecular surface active agents described in JP-A-62-170950, U.S. Pat. No. 5,380,644, etc.; the fluorine-base surface active agents described in JP-A-60-244945, JP-A-63-188135, etc.; the polysiloxane-base surface active agents described in U.S. Pat. No. 3,885,965, etc,; the polyalkylene oxide and anionic surface active agents described in JP-A-6-301140, etc.

Examples of the solvent used in the invention are those described in new edition, "Solvent Pocketbook" (published by Ohm Co., Ltd., 1994), but the solvents which can be used in the invention are not limited to them. Also, the boiling points of the solvents used in the invention are preferably 40° C. to 180° C.

Practical examples of the solvent used in the invention include hexane, cyclohexane, toluene, methanol, ethanol, isopropanol, acetone, methyl ethyl ketone, ethyl acetate, 1,1,1-trichloroethane, tetrahydrofuran, triethylamine, thiophene, trifluoroethanol, perfluoropentane, xylene, n-butanol, phenol, methyl isobutyl ketone, cyclohexanone, butyl acetate, diethyl carbonate, chlorobenzene, dibutyl ether, anisol, ethylene glycol diethyl ether, N,N-dimethylformamide, morpholine, propanesultone, perfluorotributylamine, and water.

The heat-developable photographic emulsion in the invention can be coated on various supports. Typical support used in the invention includes a polyester film, a subbed polyethylene film, a polyethylene terephthalate film, a polyethylene naphthalate film, a cellulose nitrate film, a cellulose ester film, a polyvinylacetal film, a polycarbonate film, films of other related resins, glass sheets, papers, metal foils or sheets. Flexible substrates, particularly, partially acetylated or baryta- and/or α-olefinpolymer-coated paper supports, in particular, paper supports coated with a polymer of an α-olefin having 2 to 10 carbon atoms, such as polyethylene, polypropylene, an ethylene-butene copolymer, etc., are typically used. The support may be transparent or opaque but is preferably transparent.

As a method of obtaining color images using the heat-developable light-sensitive material of the invention, there is a method described in JP-A-7-13295, gazette, page 10, left column, line 43 to page 11m left column, line 40. Also, the stabilizers for the color dye images are illustrated in British Patent 1,326,889, U.S. Pat. Nos. 3,432,300, 3,698,909, 3,574,627, 3,573,056, 3,764,337, and 4,042,394.

The heat-developable light-sensitive material of the invention may be used for various uses. However, since the heat-developable light-sensitive material if excellent in the storage stability with the passage of time and has a good antistatic property, the heat-developable light-sensitive material of the invention is preferably used for medical treatment diagnosis.

The heat-developable photographic emulsion in the invention can be coated by various coating methods including a dip coating method, an air-knife coating method, a flow coating method, and an extrusion coating using the hopper described in U.S. Pat. No. 2,681,294. If desired, two or more layers can be simultaneously coated on a support by the method described in U.S. Pat. Nos. 2,761,791 and British Patent 837,095.

The heat-developable light-sensitive material of the invention can further contain additional layers such as a dye-receiving layer for receiving a transferring dye images, an opacified layer in the case of desiring reflection printing, a protective topcoat layer, and a primer layer known in a photothamal imaging technique. It is preferred that the heat-developable light-sensitive material of the invention can form images by one heat-developable light-sensitive material only and it is preferred that a functional layer necessary for forming images, such as an image-receiving layer, etc., does not become a separate light-sensitive material.

The heat development image-forming apparatus of the invention is constituted of a light-sensitive material-supplying member, an image-exposing member, and a heat development member as the order of transferring the heat-developable light-sensitive material (hereinafter, is referred as sheet A) as the main constituents, and have each transferring member of transferring the sheet A between each members.

Sheets A are formed into sheet forms, and usually 100 sheets A are laminated (a bundle) of a definite unit and are packaged by a bag, a band, etc.

A light-sensitive material-supplying member is a member of taking out sheets A one by one and supplying it to a pull-over member 14 disposed at a down stream of the conveying direction of sheet A, and is constituted of a recording material supplying means having loading members 22 and 23, suckers 26 and 28 disposed at each of the loading members, supply roller pairs 30 and 32, conveying rollers 34 and 36, and conveying guides 38, 40, and 42.

The loading members 22 and 24 are the sites of loading magazines 100 containing the sheets A at definite positions. In the embodiment shown in FIG. 1, the apparatus has two loading members 22 and 24 and in both the loading members are loaded each of the magazines 100 each usually containing sheets A having a different size (for example, a half size (14×17 inches) and a B4 size (257×364 $mm^2$)) In the recording material supplying means disposed at the loading members 22 and 24, the sheets A are held by adsorption by the suckers 26 and 28, and by moving the suckers 26 and 28 by a known moving means such as a link mechanisms, etc., the sheets A are conveyed and supplied to the supply roller pairs 30 and 32 disposed at the loading members 22 and 24 respectively.

The sheet A of the loading member 22 supplied to the supply roller pair 30 is guided by the conveying guides 38, 40, and 42, and conveyed to the pull-over member 14 by the convey roller pair 34 and 36, and on the other hand, the sheet A of the loading member 24 supplied to the supply roller pair 32 is guided by the convey guides 40 and 42 and is conveyed to the pull-over member 14 by the convey roller pair 36.

The pull-over member 14 is a site of taking a so-called side register, that is, the register of the sheet A of the main scanning direction in an image exposure member 16 at the down stream by registering the sheet A to the direction crossing the conveying direction at a right angle (hereinafter, is referred to as a width direction). There is no particular restriction in the side registering method in the pull-over potion 14, and for example, there are illustrated various known methods, such as a method of using a resist plate of registering by being contacted to one end face of the sheet A in the width direction, and pushing means such as a roller, etc., of pushing the sheet A to the width direction to contact the end face to the resist plate, a method of using the above-described resist plate, and a guide plate, etc., movable according to the size of the sheet A in the width direction, for similarly regulating the conveying direction of the sheet A in the width direction to contact to the resist plate, etc. The sheet A conveyed to the pull-over member 14 as described above is, after registered to the direction crossing the conveying direction at a right angle as described above, conveyed to the image exposure member 16 at the down stream.

The material of the convey rollers may be made of any material but a phenol resin, POM, BT 1040 DHP manufactured by KEYFLEX Co., Ltd., and K-70EG manufactured by Kensetsu Gum K. K. are preferred. Because in the heat-developable light-sensitive material of the invention, in the conveying member before exposure, rollers are brought into contact with the surface of the light-sensitive layer side and the back surface of the heat-developable light-sensitive material conveyed at a high speed, dust and scraps of the light-sensitive material, etc., attach to the heat-developable light-sensitive material. The conveying speed of the heat-developable light-sensitive material is 1 meter/minute to 5 meters/minute, and when the conveying speed is 1.5 meters/minute to 5 meters/minute, the effect of the invention becomes remarkable.

The image-exposure member 16 is the site of imagewise exposing the sheet A by a light beam scanning exposure and is constituted of an exposure unit and a side scanning convey means. As the exposure light source, a laser light is preferred. As the laser light in the invention, a gas laser, a dye laser, a semiconductor laser, etc., are preferred. Also, a semiconductor laser or a YAG laser and a secondary higher harmonic generating device, etc., can be also used.

The exposure unit is a known light beam scanning apparatus of polarizing a light beam L modulated according to a recorded image to the main scanning direction (the width direction of the sheet A) and striking a definite recording position X, and is constituted of a light source emitting the light beam L of a narrow band wavelength region according to the spectral sensitivity characteristics of the sheet A. a recording control member of driving the light source, and a polygon mirror or and an fθ lens, etc., which is a light polarizer.

In the recording control member, the light source is driven by being pulse width modulated according to the recorded image and the light beam L pulse width modulated according to the recorded image is emitted. The light beam L emitted from the light source is polarized to the main scanning direction by the polygon mirror, dimmed by the fθ lens such that the polarized light is focused to a recording position, the light path is changed by a decay mirror, and enters the recording position.

The light source is directly modulated to carry out the pulse width modulation, or image recording may be carried out by an analog intensity modulation.

The side scanning convey means has a pair of covey roller pairs 60 and 62 placing a recording position (scanning line) between them, and while holding the sheet A at the recording position by the convey roller pairs 60 and 62, the sheet A is conveyed to the side scanning direction crossing the above-described main scanning direction at a right angle. In this case, because the light beam L pulse width modulated according to the recorded image is polarized to the main scanning direction as described above, the sheet A is two-dimensionally scanning exposed by the light beam, and an electrostatic latent image is recorded.

The sheet A conveyed to the image exposure member 16 is exposed by a laser light, etc., light-beam scanned, and after forming a latent image on the sheet A, the sheet A is conveyed to a heat development treating member 318 by the convey rollers 64, 66, etc. In this case, dusts on the back surface and the front surface of the sheet A are removed by dust-removing rollers.

The heat development treating member heat-develops the light-exposed sheet A. The heat development temperature is preferably 80 to 250° C. and more preferably 100 to 140° C. Also, the development time is preferably 1 to 180 seconds, and more preferably 10 to 90 seconds.

The preferred practical construction of the heat development treating member is equipped with a curved-type plate heater 320, which is a heater heated to a temperature necessary for treating the sheet A, supplying means 326 relatively moving (letting slip) the sheet A to the plate heater 320 while contacting the sheet A to the plate heater 320, and press rollers 322, which are the means of pressing the back side of the contact surface of sheet A and the plate heater 320 for conducting heat from the plate heater 320 to the sheet A.

The heater may be a flat plate heater or a curved plate heater. The heater is a plate-form heating member containing a heater such as a heating element, etc., laid in a plane form, and is maintained at the development temperature of the sheet A. In addition, the material, which is brought into contact with the sheet A, is simply a heat-conductive material and a rubber heater is attached to the back thereof or a construction of heating by a hot blast or a lamp may be employed.

Also, the heat development treating potion may be a construction that a heated drum is used as a heating means, an endless belt is wound round the heated drum at a definite angle, and the sheet A is heat developed by conveying the sheet A by holding the sheet A by the heated drum and the endless belt may be used.

It is preferred that the heat development treating member 318 is pre-heated to a temperature of lower than the development temperature before the sheet A reaches the heat development treating member, whereby the occurrence of the development unevenness can be more reduced. Also, it is preferred that a dust-removing roller having a tacking property is disposed directly before the heat treatment apparatus 318 to remove dusts of the sheet A supplied to the heat development treating member.

The sheet A ejected from the heat development treating member is guided to a guide plate 142 by the covey roller pair 140 and collected in the tray 146 from the ejecting roller pair 144.

As the heat development image-forming apparatus of the invention, there are the apparatus described in JP-A-11-

133572 and Fuji Medical Dry Laser Imager FM-DP L. The FM-DP L is described in "Fuji Medical Review" No. 8, pages 39–55. Also, the apparatus can be applied as the heat development system in "AD Network" proposed by Fuji Medical System as a network system adapted as the DICOM Standard.

EXAMPLES

Then, the invention is more practically explained by referring to the following examples. However, the materials, the using amounts, the ratios, the treatment processes, etc., shown in the examples can be properly changed without deviating from the scope of the invention and also the scope of the invention is not limited to the practical examples shown below.

[Preparation of silver halide grains]

After dissolving 22 g of phthalated gelatin and 30 mg of potassium bromide in 700 ml of water and adjusting the pH of the solution to 5.0 at 25° C., 159 ml of an aqueous solution containing 18.6 g of silver nitrate and 0.9 g of ammonium nitrate and an aqueous solution containing potassium bromide and potassium iodide at a 92:8 mol ratio were added to the solution by a controlled double jet method while keeping the pAg at 7.7 over a period of 10 minutes. Then, after adding thereto 476 ml of 55.4 g of silver nitrate and 2 g of ammonium nitrate and an aqueous solution containing 10 μmol/liter of di-potassium iridate hexachloride and 1 mol/liter of potassium bromide by a controlled double jet method while keeping the pAg at 7.7 over a period of 30 minutes, 1 g of 4-hydroxy-6-methyl-1,3,3*a*, 7-tetraazaindene was added thereto, and further the pH was lowered to cause the aggregated precipitation and a desalting treatment was carried out. Thereafter, 0.1 g of phenoxyethanol was added were added to the mixture and the pH and the pAg were adjusted to 5.9 and 8.2 respectively to finish the preparation of silver iodobromide grains (cubic grains of an iodine content of 8 mol %, average of 2 mol %, a mean grain size of 0.05 μm, a projected area variation coefficient of 8%, and a (100) plane ratio of 88%).

The temperature of the mixture containing the silver halide grains thus obtained was raised to 60° C., and 85 μmol of sodium thiosulfate, 11 μmol of 2,3,4,5,6-pentafluorophenyldiphenylphosphine selenide, 15 μmol of the tellurium compound having the structure described below, 3.4 μmol of chloroauric acid, and 200 μmol of thiocyanic acid were added the mixture per 1 mol of silver, after ripening for 120 minutes, the mixture was quickly cooled to 30° C. to obtain a silver halide emulsion.

[Preparation of organic acid silver salt emulsion]

While vigorously stirring a mixture of 7 g of Stearic acid, 4 g of arachidinic acid, 36 g of behenic acid, and 850 ml of distilled water at 90° C., 187 ml of an aqueous solution of NaOH at a concentration of 1 mol/liter was added to the mixture followed by reacting for 60 minutes, and after further adding thereto 65 ml of nitric acid at a concentration of 1 mol/liter, the temperature of the mixture was lowered to 50° C. Then, while more vigorously stirring the mixture, 0.6 g of N-bromosuccinimide was added thereto and after 19 minutes, silver halide grains previously prepared were added thereto such that the amount of he silver halide became 6.2 mmol. Furthermore, 125 ml of an aqueous solution of 21 g of silver nitrate was added thereto over a period of 100 seconds, the mixture was stirred for 10 minutes, and after adding thereto 0.6 g of N-bromosuccinimide, the mixture obtained was allowed to stand for 10 minutes. Thereafter, solid components were collected by suction filtration and the solid components were washed with water until the conductivity of the filtrate became 30 μS/cm. After adding 150 g of a butyl acetate solution of polyvinyl acetate at a concentration of 0.6% by weight followed by stirring, stirring was stopped, the mixture was allowed to stand to separate into an oily layer and an aqueous layer, and by removing the aqueous layer together with the salts contained, the oil layer was obtained. Then, to the oil layer was added 80 g of a 2-butanone solution of polyvinyl butyral (Denka Butyral #3000-K, manufactured by DENKI KAGAKU KOGYO KABUSHIKI KAISHA) at a concentration of 2.5% by weight followed by stirring. Furthermore, after adding thereto 0.1 mmol of pyridinium perboro- bromide and 0.1 mmol of calcium bromide di-hydrate together with 0.7 g of methanol, 200 g of 2-butanone and 59 g of polyvinyl butyral (BUTAVAR™B-76, manufactured by Monsanto Company) was added and dispersed by a homogenizer to obtain am organic acid silver salt emulsion (acicular grains having a mean short diameter of 0.04 μm, a mean long diameter of 1 μm, and a variation coefficient of 30%).

[Preparation of coating liquid of emulsion layer]

To the organic acid silver salt emulsion obtained above was added each of components such that the amount of each component became the following amount per 1 mol of silver. First, 10 mg of sodium phenylthiosulfonate, 80 mg of coloring matter 1 described below, 2 g of 2-mercapto-5-methylbenzoimidazole, 21.5 g of 4-chlorobenzophenone-2-carboxylic acid, 580 g of 2-butanone, and 220 g of dimethylformamide were added to the emulsion with stirring at 25° C. Then, 8 g of 5-tribromomethylsulfonyl-2-methylthiadizole, 6 g of 2-tribromomethylsulfonylbenzothiazole, 5 g of 4.6-ditrichloromethyl-2-phenyltriazine, 2 g of a disulfide compound described below, 150 g of 1,1-bis(2-hydroxy-3,5-dimethylphenyl)-3,5,5-trimethylhexane, 12 g of Dye 1 described below, 1.1 g of a fluorine-base surface active agent (Megafax F-176P, manufactured by DAINIPPON INK AND CHEMICALS, INC.), 590 g of 2-butanone, and 10 g of methyl isobutyl ketone were added to the mixture with stirring to obtained a coating liquid for the emulsion layer.

[Preparation of Coating Liquid for Emulsion Surface Protective Layer]

A solution was prepared by dissolving 75 g of cellulose acetate butyrate (CAB 171-15S, manufactured by Eastman Chemical Corporation), 5.7 g of 4'-methylphthalic acid, 1.5 g of tetrachlorophthalic acid anhydride, 5-1 g of tetrachlorophthalic acid, 0.3 g of a fluorine-base surface active agent (Megafax F-176P, manufactured by DAINIPPON INK AND CHEMICAL, INC.), 2 g of Sildex H31 (pearl-form silica, average size 3 μm, manufactured by Dokai Kagaku K. K.), and 7 g of polyisocyanate (Sumidur N3500, manufactured by Sumitomo Bayer Urethane Corporation) in 3070 g of 2-butanone and 30 g of ethyl acetate.

[Preparation of Coating Liquid of Electrically Conductive Layer]

A coating liquid of the electrically conductive layer was prepared by dissolving 5 g of $SnO_2$/SbO (9/1 by weight ratio, mean particle size 0.038 μm) and 50 g of polyvinyl butyral (Denka Butyral # 4000-2, manufactured by DENKI KAGAKU KOGYO KABUSHIKI KAISHA) in 512 g of 2-propanol.

[Preparation of Coating Liquid of Protective Layer for the Back Layer]

A solution was prepared by dissolving 75 g of CAB 171-15S (cellulose acetate butyrate manufactured by Eastman Chemical Corporation), 0.3 g of Megafax F-176P (a fluorine-base surface active agent, manufactured by DAINIPPON INK AND CHEMICAL, INC.), 2 g of Sildex H31

(pearl-form silica, average size 3 μm, manufactured by Dokai Kagaku K. K.) and 7 g of Sumidur N3500 (polyisocyanate, manufactured by Sumitomo Bayer Urethane Corporation) in 3070 g of 2-butanone and 30 g of ethyl acetate.

[Preparation of support having back layer]

In 64 g of 2-propanol were dissolved 6 g of polyvinyl butyral (Denka Butyral #4000-2, manufactured by DENKA KAGAKU KOGYO KABUSHIKI KAISHA), 0.2 g of Sildex H121 pearl-form silica, average size 12 μm, manufactured by Dokai Kagaku K. K.), 0.2 g of Sildex H51 (pearl-form silica, average size 5 μm, manufactured by Dokai Kagaku K. K.), and 0.1 g of a fluorine-base surface active agent (Megafax F-176P, manufactured by DAINIPPON INK AND CHEMICALS, INC.) with stirring and they were mixed. Furthermore, a solution made of 10 g of methanol and 20 g of acetone containing 420 mg of Dye 1 described below and a solution of 7 g of ethyl acetate containing 1 g of 3-isocyanatemethyl-3,5,5-trimethylhexyl isocyanate were added to the mixture to prepare a coating liquid of the back layer.

By coating the coating liquid of the back layer on a polyethylene terephthalate film so that the optical density at 810 nm became 0.7, a polyethylene terephthalate support having the back layer.

[Preparation of Heat-Developable Light-Sensitive Material]

On the polyethylene terephthalate film support having the back layer of a thickness of 175 μm were coated the coating liquid of the electrically conductive layer, the coating liquid of the emulsion layer, the coating liquid of the protective layer for the emulsion surface, and the coating liquid of the protective layer for the back layer followed by drying to prepare a heat-developable light-sensitive material. In this case, the emulsion layer was coated such that the coated silver amount became the amount defined in Table 1 described below, and the protective layer for the emulsion surface was formed such that the dry thickness on the emulsion layer became 2 μm. Also, the protective layer for the back surface was coated on the back layer surface such the smoothness (the Beck smoothness was determined using the Oken-type smoothness measurement described in "J. TAPPI Paper Pulp Test Method No. 5") became 80 seconds. Furthermore, the electrically conductive layer was formed such that the $SnO_2$/SbO amount became the amount defined in Table 1 at the position defined in Table 1.

When the solvent residual amount on the coated surface of the emulsion layer of the heat-developable light-sensitive material thus prepared was measured by a gas chromatography, 40 to 200 ppm of 2-butanone and 40 to 120 ppm of butyl acetate as the coated substance standard were detected.

The compounds used in the above examples are shown below.

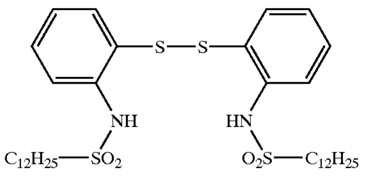

Disulfide compound

-continued

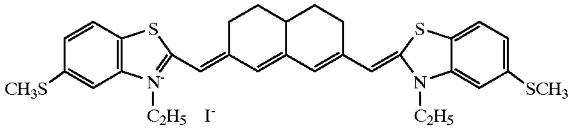

Coloring matter 1

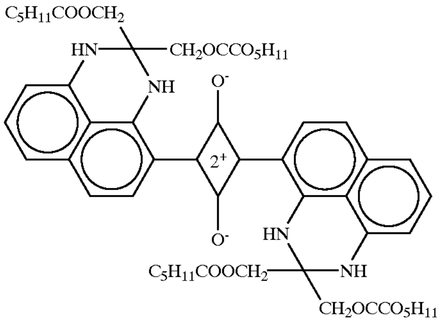

Dye 1

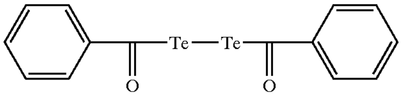

Tellurium compound (Measurement of Lateral Resistance)

About each heat-developable light-sensitive material, the lateral resistance was measured by the method described in the specification. The results are shown in Table 1 below.

(Evaluation of Storage Stability with the Passage of Time)

Each heat-developable light-sensitive material was cut into the B4 size and allowed to stand for one day under the condition of 25° C. and a relative humidity of 50%. Thereafter, 10 samples as one unit were closed tightly in a bag made of a moisture proof material, the bag was placed in a vanity case of 35.1 cm×26.9×3.0 cm and allowed to stand for 5 days at 50° C. (called as forcibly aged samples). Also, comparative samples aged by the same conditions as the forcible aging except that the storage temperature was changed to 4° C. were prepared. After exposing these sample by a laser actinometer equipped with a diode of an emitting light wavelength of 810 nm, each sample was treated at 120° C. for 15 seconds (developed), and the density of fog formed was measured by a densitometer. The storage stability with the passage of time (aged storage property) was evaluated by the fog-increasing ratio calculated as follows. The lower increasing ratio shows that the storage stability with the passage of time is better.

$$\text{Fog-increasing ratio}=[(A)-(B)]/[(C)-(D)]$$

Wherein;

(A) Fog of the same subjected to the forcible aging.

(B): Fog of the comparative sample.

(C): The maximum density of the comparative sample.

(D): The density of the support.

(Evaluation of White Spots)

Each heat-developable light-sensitive material was cut into the B4 size and a laminate of 101 sheets was prepared. The laminate was mounted on the light-sensitive material-supplying member of the heat development image-forming apparatus as described in FIG. 1, and they were allowed to stand under the condition of a temperature of 25° C. and a relative humidity of 50%. Thereafter, after conveying each light-sensitive material by the facing convey rollers 44 (using BT 1040 DHP) described in FIG. 1 at the conveying speed shown in Table 1 below, the light-sensitive material was light-exposed at a density of 1.2, and the amount of white spots (WS) formed was functionally evaluated. The standards of the functional evaluation are as described below. By the test, the electrostatic charging characteristics of the heat-developable light-sensitive material can be evaluated.

A: Good

B: The white spots are anxious about a little but in the level of no problem of reading images.

C: The level of causing problem for reading images.

The results are shown together in Table 1 below. From the results of the table, is it clear that the heat-developable light-sensitive materials satisfying the conditions of the invention have a good storage stability (shelf life) with the passage of time and are excellent in the antistatic faculty.

TABLE 1

| Heat-developable light-sensitive material | Coated amount of $SnO_2$/SbO ($mg/m^2$) | Coated silver amount ($g/m^2$) | Position of coated electrically conductive layer | Side face resistance ($10^9$ Ω) | Increased ratio of fog | Evaluation of white spots | Conveying speed (m/min.) |
|---|---|---|---|---|---|---|---|
| A | 80 | 2.2 | Between support and back layer | 96 | 54 | B | 1.2 |
| B | 80 | 0.8 | Between support and back layer | 96 | 22 | B | 1.2 |
| C (Invention) | 80 | 1.9 | Between support and back layer | 96 | 8 | B | 1.2 |
| D | 0 | 1.6 | Between support and back layer | 18000 | 0 | C | 1.2 |
| E | 40 | 1.6 | Between support and back layer | 7300 | 1 | C | 1.2 |
| F | 60 | 1.6 | Between support and back layer | 1020 | 2 | C | 1.2 |
| G (Invention) | 80 | 1.6 | Between support and back layer | 96 | 2.2 | A | 1.2 |
| H (Invention) | 100 | 1.6 | Between support and back layer | 23 | 3 | A | 1.2 |
| I (Invention) | 120 | 1.6 | Between support and back layer | 1.2 | 4 | A | 1.2 |
| J (Invention) | 80 | 1.6 | Between support and emulsion layer | 9.6 | 7 | B | 1.2 |
| K (Invention) | 80 | 1.6 | Back layer surface | 9.6 | 6 | B | 1.2 |
| L (Invention) | 80 | 1.6 | Emulsion layer surface | 9.6 | 10 | B | 1.2 |
| M (Invention) | 80 | 1.6 | Between support and back layer | 96 | 2.2 | A | 1.7 |
| N (Invention) | 80 | 1.6 | Between support and back layer | 96 | 2.2 | A | 4.5 |
| O (Invention) | 80 | 1.6 | Between support and back layer | 96 | 2.2 | B | 6.0 |
| P | 60 | 1.6 | Between support and back layer | 1020 | 2 | A | 0.8 |
| Q | 80 | 1.6 | Between support and back layer | 96 | 2.2 | A | 0.8 |

As described above, according to the invention, in the heat development system of forming images by a heat development image-forming apparatus having a quickened conveying member, a heat-developable light-sensitive material excellent in the storage stability with the passage of time and the antistatic faculty is provided. Accordingly, the present invention can be effectively used for various uses including for medical treatment diagnosis, etc.

The entire disclosure of each and every foreign patent application from which the benefit of foreign priority has been claimed in the present application is incorporated herein by reference, as if fully set forth herein.

What is claimed is:

1. A heat development system of forming an image by exposing and heat developing a sheet-form heat developable light-sensitive material by using a heat development image-forming apparatus comprising a conveying member, a light-sensitive material-supplying member and an image exposure member, said heat developable light-sensitive material comprising a support and a light-sensitive layer comprising a binder, an organic silver salt, a reducing agent for a silver ion, and light-sensitive silver halide grains, wherein said conveying member conveys said heat developable light-sensitive material from said light-sensitive material-supplying member to said image exposure member at a conveying speed of 1 meter/minute to 5 meter/minute, said light-sensitive material contains said organic silver salt and said light-sensitive silver halide in the total amount of 1 $g/m^2$ to 2 $g/m^2$ in terms of Ag, said light-sensitive material further comprises: a back layer including at least one layer in the opposite side of said light-sensitive layer; and an electrically conductive layer comprising a binder and at least one crystalline metal oxide selected from the group consisting of ZnO, $TiO_2$, $SnO_2$, $Al_2O_3$, $SiO_2$, MgO, BaO, $MoO_3$ and a composite oxide thereof, and said light-sensitive material has a lateral resistance under the environment of 25° C. and a relative humidity of 10% of not larger than $10^{11}$Ω.

2. The heat development system according to claim 1, wherein said electrically conductive layer is formed between said light-sensitive layer and said support or between said back layer and said support.

3. The heat development system according to claim 1 or 2, wherein said lateral resistance under the environment of 25° C. and a relative humidity of 10% is not larger than $10^{10}\Omega$.

4. The heat development system according to claim 1, wherein a ratio of Ag amount of said organic silver salt to Ag amount of said light-sensitive silver halide is 1:1 to 20:1.

5. The heat development system according to claim 1, wherein said light-sensitive silver halide has a grain size of 0.0001 $\mu$m to 0.15 $\mu$m.

6. The heat development system according to claim 1, wherein an amount of said light-sensitive silver halide is 0.01 mol to 0.5 mol per 1 mol of said organic silver salt.

7. The heat development system according to claim 1, wherein said light sensitive silver layer has an absorption at a exposure wavelength of 0.1 to 0.6.

8. The heat development system according to claim 1, wherein said system is used for medical treatment diagnosis.

9. The heat development system according to claim 2, wherein said system is used for medical treatment diagnosis.

10. The heat development system according to claim 3, wherein said system is used for medical treatment diagnosis.

11. A method of forming an image comprising the steps of:

1) exposing and heat developing a sheet-form heat developable light-sensitive material by using a heat development image-forming apparatus, wherein a) said apparatus comprises a conveying member, a light sensitive material-supplying member and an image exposure member, wherein b) said heat developable light-sensitive material comprises a support and a light-sensitive layer, wherein i) said light-sensitive layer comprises a binder, an organic silver salt, a reducing agent for a silver ion, and light-sensitive silver halide grains, wherein said organic silver salt and said light-sensitive silver halide is present in an amount of 1 g/$m^2$ to 2 g/$m^2$ in terms of AG;

ii) said light-sensitive material further comprises: 1) a back layer including at least one layer in the opposite side of said light-sensitive layer and 2) an electrically conductive layer comprising a binder and at least one crystalline metal oxide selected from the group consisting of ZnO, $TiO_2$, $SnO_2$, $Al_2O_3$, $In_2O_3$,$SiO_2$, MgO, BaO, $MoO_3$ and a composite oxide thereof, wherein the light-sensitive material has a lateral resistance under the environment of 25° C. and a relative humidity of 10% of not larger than $10^{11}\Omega$;

2) conveying with said conveying member said heat developable light-sensitive material from said light-sensitive material supplying member to said image exposure member at a conveying speed of 1 m/min. to 5 m/min.

* * * * *